United States Patent
Zhang et al.

(10) Patent No.: US 12,429,954 B2
(45) Date of Patent: Sep. 30, 2025

(54) CROSS-DEVICE TASK MIGRATION METHOD, APPARATUS, AND SYSTEM, AND STORAGE MEDIUM

(71) Applicant: HUAWEI TECHNOLOGIES CO., LTD., Guangdong (CN)

(72) Inventors: Yanan Zhang, Shenzhen (CN); Hongjun Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/558,146

(22) PCT Filed: Mar. 29, 2022

(86) PCT No.: PCT/CN2022/083629
§ 371 (c)(1),
(2) Date: Oct. 30, 2023

(87) PCT Pub. No.: WO2022/227988
PCT Pub. Date: Nov. 3, 2022

(65) Prior Publication Data
US 2024/0220026 A1    Jul. 4, 2024

(30) Foreign Application Priority Data
Apr. 30, 2021   (CN) .......................... 202110484322.8

(51) Int. Cl.
*G06F 3/01*       (2006.01)
*G06F 3/04817*   (2022.01)

(52) U.S. Cl.
CPC .......... *G06F 3/017* (2013.01); *G06F 3/04817* (2013.01)

(58) Field of Classification Search
CPC ............................ G06F 3/017; G06F 3/04817
See application file for complete search history.

(56) References Cited

U.S. PATENT DOCUMENTS

| | | | |
|---|---|---|---|
| 2012/0144347 A1 | 6/2012 | Jo et al. | |
| 2012/0178536 A1* | 7/2012 | Oh ...................... | H04L 12/1822 463/42 |
| 2013/0162502 A1* | 6/2013 | Lee .................... | H04N 21/4424 345/1.2 |
| 2014/0203999 A1* | 7/2014 | Shim ...................... | G06F 9/451 345/2.2 |
| 2015/0373065 A1* | 12/2015 | Holmquist .......... | H04L 65/1069 715/753 |

(Continued)

FOREIGN PATENT DOCUMENTS

| | | |
|---|---|---|
| CN | 103593153 A | 2/2014 |
| CN | 104584503 A | 4/2015 |

(Continued)

*Primary Examiner* — Md Saiful A Siddiqui

(57) ABSTRACT

The method includes: obtaining, by a first terminal, a first gesture performed on a current page, and scaling down the current page, where the first gesture indicates to migrate a task; determining a second terminal, where the second terminal is at least one of at least one online device around the first terminal; determining content for migration based on the scaled-down current page; and sending the content for migration to the second terminal based on a second gesture to implement cross-device task migration, where the first gesture and second gesture are pre-specified hand motions.

16 Claims, 29 Drawing Sheets

(56) References Cited

U.S. PATENT DOCUMENTS

| | | | |
|---|---|---|---|
| 2017/0046037 A1 | 2/2017 | Dand | |
| 2017/0147129 A1* | 5/2017 | Kyoun | H04N 21/4858 |
| 2020/0117331 A1* | 4/2020 | Ye | G06F 3/0482 |
| 2021/0064191 A1* | 3/2021 | Liao | G06F 3/04845 |
| 2022/0004315 A1 | 1/2022 | Zhang et al. | |
| 2022/0214800 A1* | 7/2022 | Dong | G06F 9/451 |
| 2022/0318036 A1 | 10/2022 | Zhang et al. | |
| 2022/0334855 A1 | 10/2022 | Meng | |
| 2023/0041287 A1 | 2/2023 | Tian et al. | |

FOREIGN PATENT DOCUMENTS

| | | |
|---|---|---|
| CN | 109660842 A | 4/2019 |
| CN | 110427151 A | 11/2019 |
| CN | 110515579 A | 11/2019 |
| CN | 110928511 A | 3/2020 |
| CN | 111176506 A | 5/2020 |
| CN | 111240547 A | 6/2020 |
| CN | 111399959 A | 7/2020 |
| CN | 112083867 A | 12/2020 |
| CN | 115268618 A | 11/2022 |
| WO | 2017173793 A1 | 10/2017 |

\* cited by examiner

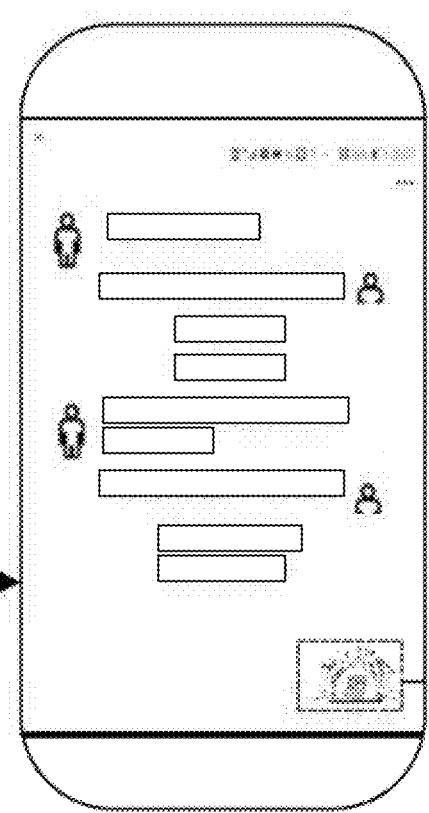
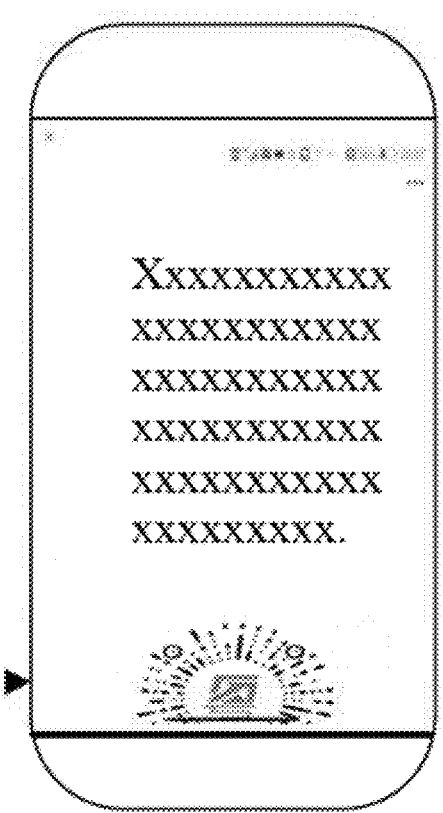
FIG. 1(c)
FIG. 1(d)

CROSS-DEVICE TASK MIGRATION METHOD, APPARATUS, AND SYSTEM, AND STORAGE MEDIUM

CROSS REFERENCE TO RELATED APPLICATIONS

This application is a national stage application of International Application No. PCT/CN2022/083629, filed on Mar. 29, 2022, which claims priority to Chinese Patent Application No. 202110484322.8, filed on Apr. 30, 2021. Both of the aforementioned applications are hereby incorporated by reference in their entireties.

TECHNICAL FIELD

The present invention relates to the field of computer technologies, and in particular, to a cross-device task migration method, apparatus, and system, and a storage medium.

BACKGROUND

As technologies advance over time, data in the form of files, pictures, etc. are often shared by multiple proximate devices. Additionally, tasks may be sent from one device to another. The task sending (cross device task sending) is becoming more common. For example, in many cases in daily life, videos or photos on a mobile phone may be shared with surrounding colleagues, friends, or families. Images on the mobile phone may be sent to a screen of a television or a computer. This technology is referred to as AIRPLAY® (Airplay). To use airplay for wireless projection, a target device needs to be selected after an airplay option is tapped on a display of the mobile phone in a same Wi-Fi environment, to establish a connection for projection.

In another case, a single display screen of a mobile phone is used to view displayed information. However, in some special scenarios, for example, in on-site large-scale monitoring, drawing, or electronic map technology application, multi-window display is required. Therefore, a user needs a large display screen to display a plurality of pieces of content, so that details of the scenarios can be viewed clearly with simplified operations. When a single display screen cannot satisfy displaying a plurality of pieces of content at the same time, another device can be used to share display windows of the mobile phone. This technology is referred to as sidecar (sidecar). This technology enables two systems of different devices to be connected, and content of the mobile phone to be extended on a computer or tablet for display. The computer or tablet becomes a second screen of the mobile phone, and monitoring, drawing, or video playing can be performed on different screens.

However, currently, Airplay is applied only for sending a specific audio/video media task between devices over an Airplay protocol, and cannot be applied in all scenarios. Similarly, sidecar is applied only for extension on a screen of a device over a sidecar protocol in a specific scenario, and cannot be applied in all scenarios. As floating windows are increasingly used on terminal devices with screens, a cross-device task migration method is urgently needed.

SUMMARY

To resolve the foregoing problem, embodiments of this disclosure provide a cross-device task migration method, apparatus, system, and a storage medium.

According to a first aspect, an embodiment of this disclosure provides a cross-device task migration method, where the method includes: obtaining, by a first terminal, a first gesture performed on a current page, and scaling down the current page, where the first gesture indicates to migrate a task; determining a second terminal, where the second terminal is at least one of at least one online device around the first terminal; determining content for migration based on the scaled-down current page; and sending the content for migration to the second terminal based on a second gesture to implement cross-device task migration, where the first gesture and second gesture are pre-specified hand motions. In this way, cross-device task migration of any content can be implemented on any device in any scenario.

In a possible implementation, the first gesture is one of a gesture of touch and hold with one finger, a multi-finger swipe gesture, and a multi-finger pinch gesture. In this way, cross-device task migration of any content may be initiated when a pre-specified hand motion is identified.

In a possible implementation, the obtaining, by a first terminal, a first gesture performed on a current page, and scaling down the current page includes: scaling down, by the first terminal based on the first gesture performed on the current page, the current page to a preset threshold, and displaying the current page in a floating window/floating bubble. In this way, the current page can be prepared in a task form suitable for migration.

In a possible implementation, the obtaining, by a first terminal, a first gesture performed on a current page, and scaling down the current page includes: scaling down, by the first terminal, the current page based on a motion speed of the first gesture performed on the current page; or when the first gesture slides to a touch target, displaying the scaled-down current page in a floating window/floating bubble, where the touch target is a preset interaction area. In this way, a current page of any content can be prepared in a task form suitable for migration at proper time.

In a possible implementation, after the scaling down the current page, the method includes: when the current page is a child-level page, displaying a transparent or semi-transparent previous-level page on a background layer; or when the current page is a first-level page, displaying a transparent or semi-transparent home screen on the background layer. In this way, a preparation state of the first terminal before task migration may be displayed to the user.

In a possible implementation, after the scaling down the current page, the method includes: displaying a super favorites icon and a floating window icon. In this way, feasible operation selections may be displayed to a user.

In a possible implementation, the method includes: saving, in super favorites based on a gesture performed on the super favorites icon, current content corresponding to the current page, and sharing the current content with the second terminal. In this way, another feasible operation manner of cross-device task migration can be provided for the user.

In a possible implementation, the determining a second terminal includes: obtaining, based on motion of the first gesture, distance and direction information of at least one online device around the first terminal by using a communication technology like sound wave, carrierless communication, wireless fidelity, or Bluetooth, displaying an icon corresponding to the at least one online device, and determining the second terminal. In this way, any available online device around the first terminal may be obtained, to determine a target device for task migration.

In a possible implementation, the determining a second terminal includes: obtaining distance, direction, and/or historical usage information of at least one online device around the first terminal; calculating a confidence level value of the at least one online device based on the distance, direction, and/or historical usage information, where the confidence level value includes a distance confidence level value, a direction confidence level value, and/or a historical usage confidence level value; and determining a device whose confidence level value meets a matching requirement as the second terminal. In this way, a target device that best fits a task migration requirement can be automatically obtained.

In a possible implementation, the determining a second terminal includes: obtaining application configuration information of the at least one online device around the first terminal by using a communication technology like sound wave, carrierless communication, wireless fidelity, or Bluetooth; and determining, based on the application configuration information of the at least one online device around the first terminal, a device that is in the at least one online device and that matches an application corresponding to the current page of the first terminal as the second terminal. In this way, a target device that best fits a task migration requirement can be automatically obtained.

In a possible implementation, the determining a second terminal includes: sensing at least one nearby online device when the first terminal rotates, and determining, by using a UWB technology, at least one online device in a matched direction as the second terminal. In this way, a target device that best fits a task migration requirement can be automatically obtained.

In a possible implementation, the determining a second terminal includes: tapping the icon based on the second gesture, to determine the second terminal; or tapping a touch target corresponding to the icon based on the second gesture, to determine the second terminal. In this way, the user can select a target device for task migration.

In a possible implementation, the determining a second terminal further includes: scaling up or turning on an icon corresponding to the second terminal. In this way, the target device for task migration can be noticeably provided to the user.

In a possible implementation, the determining content for migration based on the scaled-down current page includes: determining, based on the scaled-down current page, that the content for migration includes one of the following content or a combination thereof: a partial screenshot, a full-screen screenshot, at least one split-screen page, at least one floating window, or at least one floating bubble of the current page. In this way, it may be determined that a migration task is in a plurality of display forms of the current page.

In a possible implementation, the determining content for migration based on the scaled-down current page includes: determining, based on the scaled-down current page, that the content for migration includes one of the following content or a combination thereof: a link of the current page, a full-screen screenshot and a corresponding application that is being executed, a partial screenshot and a corresponding application that is being executed, at least one split-screen page and a corresponding application that is being executed, at least one floating window and a corresponding application that is being executed, or at least one floating bubble and a corresponding application that is being executed. In this way, it may be determined that a migration task is a combination of any one or more pieces of content and an application unit that is being executed.

In a possible implementation, the second gesture includes one of the following gestures: a one-finger or multi-finger tap, touch and hold and drag with one finger or a plurality of fingers, and a one-finger or multi-finger push. In this way, cross-device task migration of any content may be performed when a pre-specified second hand motion is identified.

In a possible implementation, the sending the content for migration to the second terminal based on a second gesture includes: extracting the content for migration based on a position of a one-finger tap or multi-finger tap performed on the current page, and sending the content for migration to the second terminal, where the content for migration includes one of the following content or a combination thereof: an attachment, a picture, a video, or a link. In this way, cross-device task migration of any content can be performed.

In a possible implementation, after the sending the content for migration to the second terminal based on a second gesture, the method includes: when the current page is a child-level page, displaying a transparent or semi-transparent previous-level page on a background layer; or when the current page is a first-level page, displaying the transparent or semi-transparent home screen on the background layer. In this way, a terminal state after cross-device task migration can be displayed to the user.

In a possible implementation, the sending the content for migration to the second terminal based on a second gesture includes: directly starting, by the first terminal, an application corresponding to the content for migration on the second terminal through communication or remote control, and sending the content for migration to the second terminal. In this way, the second terminal can receive the content for migration and execute a minimum unit of a corresponding application.

In a possible implementation, the first terminal generates a mirror of the current task on the second terminal through communication or remote control. In this way, the second terminal can receive the content for migration and display the page or the floating window on the first terminal.

According to a second aspect, an embodiment of this disclosure provides a cross-device task migration apparatus, including: at least one memory, configured to store a program; and at least one processor, configured to execute the program stored in the memory. When the program stored in the memory is executed, the processor is configured to perform the cross-device task migration method according to any one of the foregoing implementations of the first aspect. Beneficial effects thereof are described above. Details are not described again.

According to a third aspect, an embodiment of this disclosure provides a cross-device task migration system, including at least a first terminal and a second terminal, where the two terminals can communicate and are connected with each other. The first terminal includes: at least one memory configured to store a program; and at least one processor, configured to execute the program stored in the memory. When the program stored in the memory is executed, the processor is configured to perform the cross-device task migration method according to any one of the foregoing implementations of the first aspect. The second terminal is configured to receive and display content for migration sent by the first terminal.

According to a fourth aspect, an embodiment of this disclosure provides a storage medium, where the storage medium stores instructions, and when the instructions are run on a terminal, a first terminal is enabled to perform the method according to any one of the implementations of the first aspect.

According to a fifth aspect, an embodiment of this disclosure provides a program product including instructions. When the instructions are run on a processor, the processor is enabled to perform the method according to any one of the implementations of the first aspect.

BRIEF DESCRIPTION OF DRAWINGS

To explain technical solutions in embodiments disclosed in this disclosure more clearly, the following briefly describes accompanying drawings used for describing the embodiments. It is clear that the accompanying drawings in the following descriptions show merely embodiments disclosed in this disclosure, and a person of ordinary skill in the art may still derive other drawings from these accompanying drawings without creative efforts.

The following briefly describes the accompanying drawings used to describe embodiments or the conventional technology.

FIG. 1(a) to FIG. 1(d) are a schematic diagram of using a floating window to display a browsed web page in an interface of an instant messaging application according to a solution;

DESCRIPTION OF EMBODIMENTS

Figure 1A:
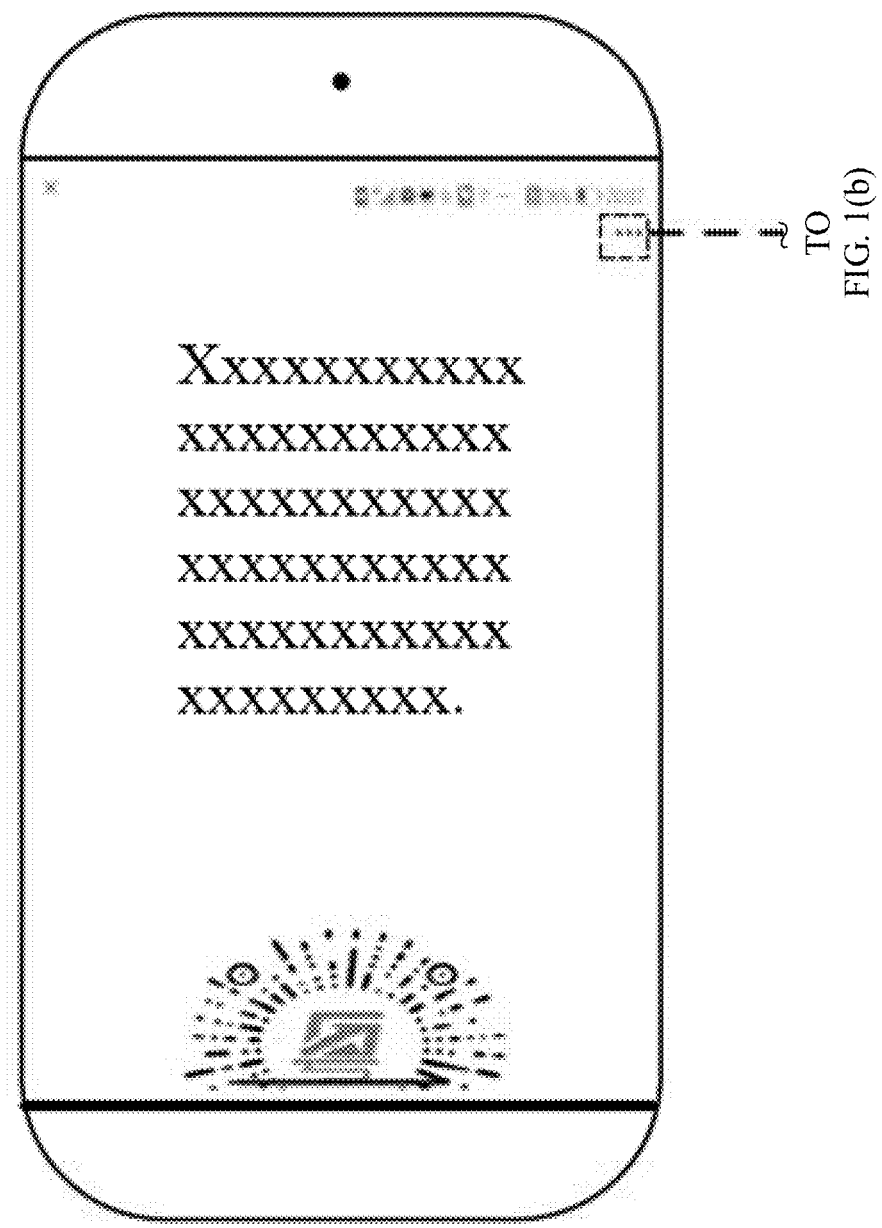
Figure 1B:
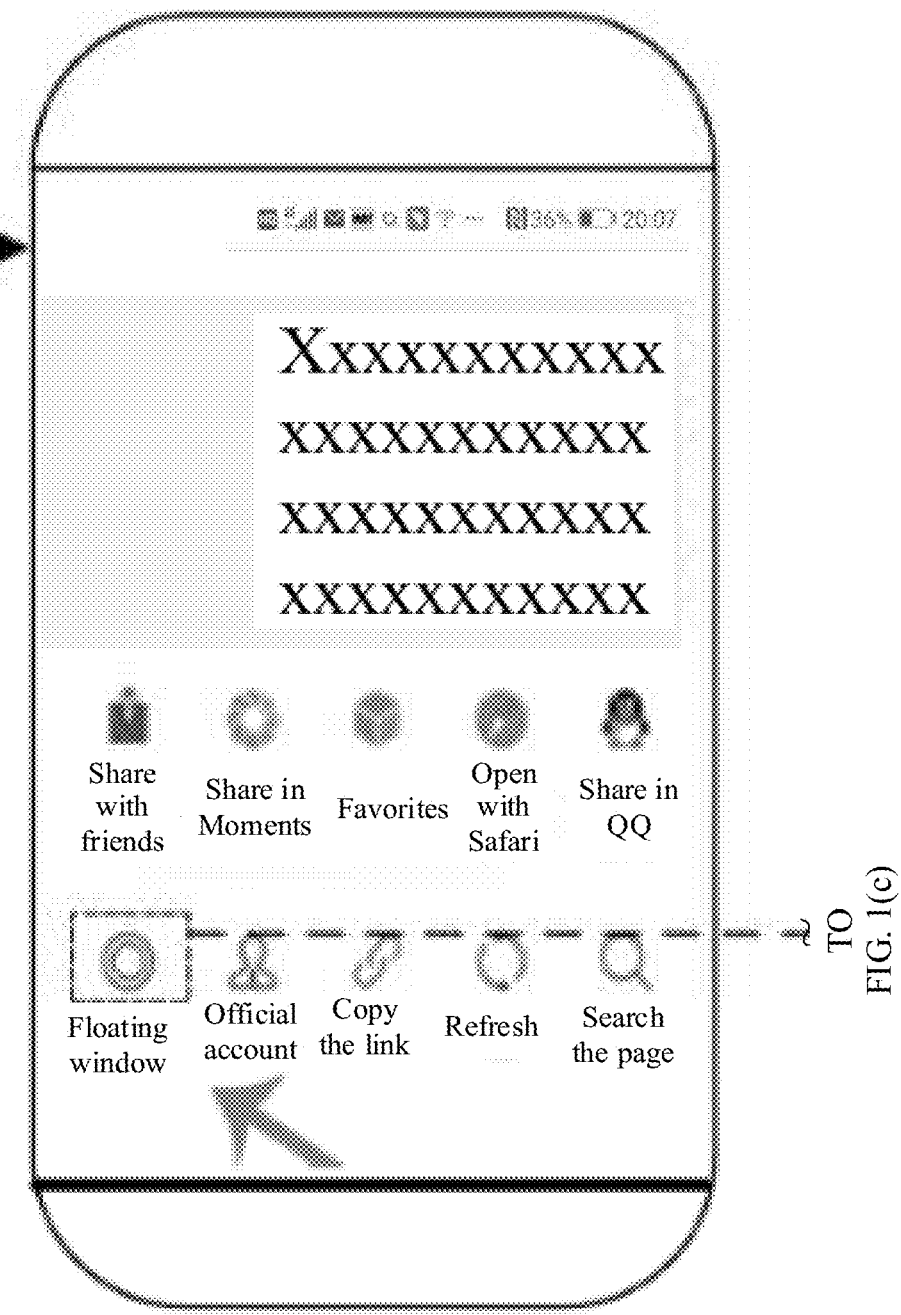

In the descriptions of embodiments of this disclosure, "some embodiments" are a subset of all possible embodiments. However, it may be understood that, "some embodiments" may be same subsets or different subsets of all possible embodiments, and may be combined with each other if they do not conflict with each other.

In the descriptions of embodiments of this disclosure, the word "example", "for example", "in an example", or the like is used to give an example, an illustration, or a description. Any embodiment or design scheme described as "example", "for example", or "in an example" in this application should not be explained as being more preferred or having more advantages than another embodiment or design scheme. Specifically, use of "example", "for example", or "in an example" is intended to present a related concept in a specific manner.

The term "and/or" in embodiments of this disclosure describes only an association relationship between associated objects and represents that three relationships may exist. For example, A and/or B may represent the following three cases: Only A exists, both A and B exist, and only B exists. In addition, unless otherwise specified, the term "a plurality of" means two or more than two. For example, "a plurality of systems" means two or more systems, and "a plurality of terminals" means two or more terminals.

Moreover, the terms "first" and "second" are merely intended for a purpose of description, and shall not be understood as an indication or implication of relative importance or implicit indication of an indicated technical feature. Therefore, a feature limited by "first" or "second" may explicitly or implicitly include one or more such features. Terms "include", "contain", "have", and variants of the terms all mean "include but are not limited to", unless otherwise specifically emphasized.

In the following descriptions, involved reference numerals such as S110 and S120 that indicate steps do not necessarily indicate that the steps are to be performed based on the order, and consecutive steps may be transposed if allowed, or may be performed simultaneously.

Unless otherwise defined, all technical and scientific terms used in this disclosure have same meanings as those usually understood by a person skilled in the art of this application. The terms used in this disclosure are merely for the purpose of describing embodiments of this disclosure, but are not intended to limit this application.

The following describes technical solutions in embodiments of this disclosure with reference to the accompanying drawings in embodiments of this disclosure.

FIG. 1(a) to FIG. 1(d) are a schematic diagram of using a floating window to display a browsed web page in an interface of an instant messaging application according to a solution. As shown in FIG. 1(a), when a mobile phone displays, on a single display screen, information on a web page currently browsed by a user, the mobile phone cannot execute an instant chat like WeChat or QQ. The mobile phone provides a floating window function for the user. The user taps a function option " . . . " in an upper-right corner in FIG. 1(a), and selects "Floating window" in a function list at the bottom in FIG. 1(b). A currently browsed web page is displayed as a floating icon in a lower-right corner of an instant chat page in FIG. 1(c). When the user taps the floating icon, the mobile phone restores a link and displays information on the browsed web page in FIG. 1(d). A disadvantage of this solution is that the floating window function can be used only for a specific task, for example, WeChat, and is limited to one device, and therefore, only one task can be performed at a time.

Figure 2:
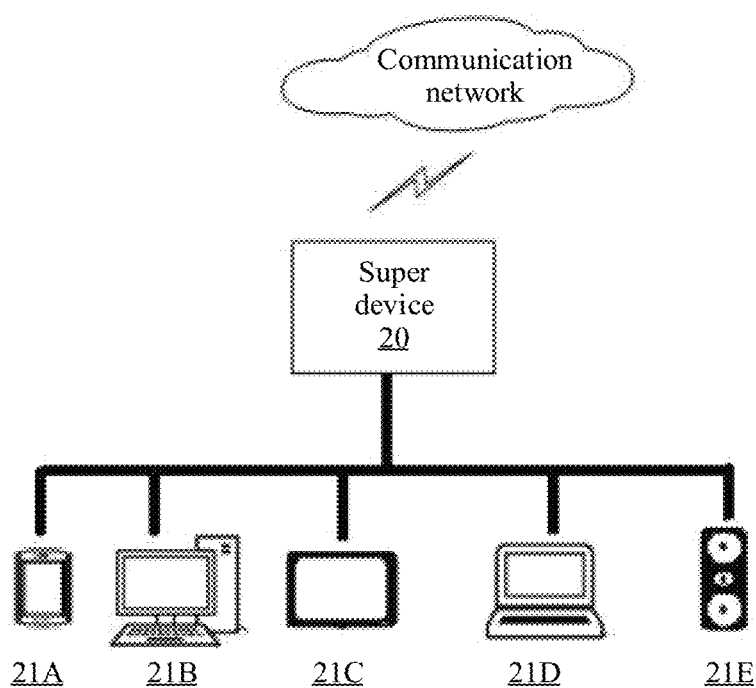
FIG. 2 is a diagram of an application scenario of a cross-device task migration method according to Embodiment 1 of this application.

FIG. 2 is a diagram of an application scenario of a cross-device task migration method according to Embodiment 1 of this application. In the method, functions of a terminal 1 and a terminal 2 are "moved" and "integrated" by using a distributed technology, to form a super device, and any content of the terminal 1 is quickly sent to the terminal 2 based on a window technology and a feature ability (feature ability, FA) technology. The terminal 1 is denoted as a first terminal, and the terminal 2 is denoted as a second terminal.

A user may use the "super device" to implement automatic connection among nearby intelligent devices running a HarmonyOS® system, such as a Huawei phone, a battery, a tablet, a sound box, a computer, and a camera, to form a collaborative working scenario. For example, a user can directly push related content to a nearby computer, tablet, and the like by using a mobile phone running the HarmonyOS® system.

The super device is not limited to connection between a mobile phone and an intelligent device, and may be connection among a plurality of devices. A specific quantity of devices may be determined based on an application scenario of a user. For example, in a travel scenario, a mobile phone, a watch, and a head unit can form a super device. In this case, when a user enables navigation on the mobile phone, a navigation function is automatically displayed on the watch and the head unit while the user does not need to perform operations on the watch and the head unit.

The window technology refers to a universal image display manner, for example, display technologies for displaying a home screen, a floating window, picture-in-picture, and the like of a display. A size and a position of a page, a floating window, or a floating bubble may be adjusted by using the window technology.

An ability is an abstraction of a functionality that an application can provide, and is an important part of the application. An application may provide a plurality of functionalities, that is, may have a plurality of abilities. The HarmonyOS® system supports application deployment by ability. Abilities may be classified into two types: feature ability (feature ability, FA) and particle ability (particle ability, PA). Each type provides a different template for a developer, so that different service functions can be implemented.

The feature ability (feature ability, FA) technology, or FA technology for short, supports a page template that provides a user interaction ability. A page instance can contain a group of related pages. Each page is represented by an AbilitySlice instance. The FA technology is used to migrate any content across devices by using a minimum ability unit of a current application.

As shown in FIG. 2, the super device may include at least two terminals. Each of the at least two terminals communicate and connect with each other by using a wireless network or wired data.

It should be noted that the terminal 1 may be one of the following devices currently used by the user: a mobile phone 21A, a desktop computer 21B, a smart screen 21C, a notebook computer 21D, a smart sound box 21E, and the like; and the terminal 2 may be one or more of the foregoing devices that communicate with the terminal 1 by using a wireless network or wired data.

It should be noted that the wireless network may include a mobile cellular network (for example, a 5th generation 5G mobile communication network), a wireless local area network (wireless local area network, WLAN), a wide area network (wide area network, WAN), Bluetooth® (Bluetooth), wireless fidelity (wireless fidelity, Wi-Fi), Zigbee® (Zigbee), near field communication (near field communication, NFC), ultra-wideband (ultra-wideband, UWB), or the like. An HDMI® data cable, a USB data cable, or the like may be used for the wired data.

Generally, a user can make a gesture on touchpads or touchscreens of most intelligent terminals by touching a device or by using a controller connected to the device. A basic component used in touch-based gesture recognition is a touchpad or a touchscreen, and gesture recognition is implemented by sensing a physical contact on a conventional touchpad or touchscreen through a sensor. Usually, touch-based gesture recognition includes a multi-finger gesture and a motion gesture. The multi-finger recognition includes a resistive touch, a capacitive touch, and an optical camera-based touch.

For example, the sensor may be a touchscreen sensor, for example, a pressure sensor. The terminal 1 may determine a touch point of a finger of a user based on a pressure signal collected by the pressure sensor on a touchpad or a touchscreen. Further, the pressure signal collected by the pressure sensor at a touch point may be one touch point or a plurality of touch points, where the plurality of touch points refer to two to five touch points. A processor of the terminal 1 may determine a gesture of the user based on a quantity of touch points and a finger motion track.

For example, the sensor may be a non-contact sensor. Currently, the non-contact sensor mainly includes an infrared sensor and a capacitive sensor. For example, an infrared sensor can emit and receive waves in a form of heat, and can receive thermal radiation from a finger. A motion detector with an infrared sensor is configured to recognize a multi-finger gesture and a motion gesture on a touchpad or a touchscreen. For another example, the capacitive sensor is a non-contact apparatus. In application requiring contact and application requiring no contact, an output current slightly changes based on an electricity feature of capacitance between two conductive surfaces within a specific distance. When an antenna in the capacitive sensor is large, the capacitive sensor is sensitive, and can measure a position change of any conductive target with high resolution and identify a multi-finger touch gesture and a motion gesture on a touchpad or a touchscreen.

For example, the non-contact sensor further includes a camera, a SWING sensor, an ultrasonic sensor, or the like. For example, the terminal 1 may identify a first gesture of the user based on an image of a finger of the user collected by the camera on a display screen, or identify the first gesture of the user based on a signal of a finger of the user collected by the SWING sensor on the display screen, or identify the first gesture of the user based on an ultrasonic signal of a finger of the user collected by the ultrasonic sensor on the display screen.

In the cross-device task migration method provided in Embodiment 1 of this application, the terminal 1 identifies the first gesture of the user, and sends a running task corresponding to a current page to the terminal 2 (a target device), where the current page may be a full-screen page, a split-screen page, and/or a page with a floating window or a floating bubble of the terminal 1. For example, when the terminal 1 is playing a video, the terminal 1 identifies the first gesture of the user, and sends a video playing task corresponding to a current page to the terminal 2 (the target device), instead of merely sending a currently displayed page. When receiving the video playing task, the terminal 2 starts a video player to play the video. If the terminal 2 does not have an ability to play the video, a playing image of the terminal 1 may be mirrored.

Figure 3:
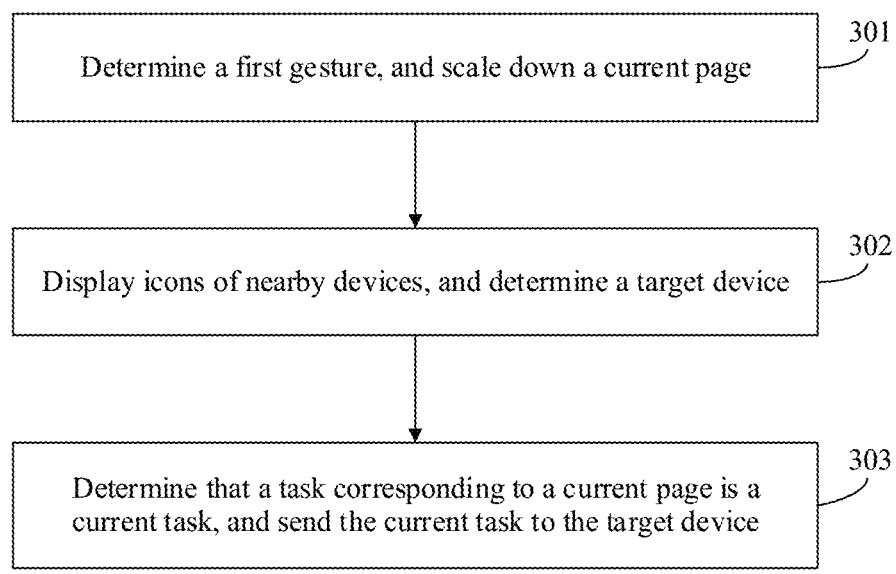
FIG. 3 is a flowchart of a cross-device task migration method according to Embodiment 1 of this application.

FIG. 3 is a flowchart of a cross-device task migration method according to Embodiment 1 of this application. As shown in FIG. 3, a procedure in Embodiment 1 of this application includes the following steps S301 to S303.

S301: A processor of a terminal 1 identifies a first gesture of a user, and scales down a current page. The first gesture may be a swipe gesture performed with a finger or a multi-finger pinch gesture, and indicates to migrate a task.

Figure 4A:
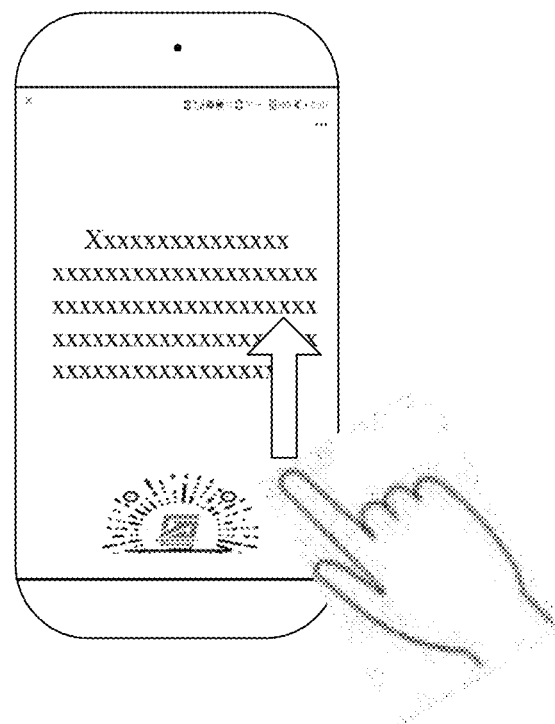
FIG. 4A is a schematic diagram of a one-finger swipe gesture according to Embodiment 1 of this application.

For example, migration may be a process in which the terminal 1 sends a current page of the terminal 1 to the terminal 2, and an application of the terminal 2 automatically opens the current page. This is similar to WeChat sharing. Alternatively, a page may be sent to a corresponding target device by using an FA ability, and when a corresponding application like WeChat is not installed on the target device, a corresponding web page is opened by using an FA ability of a HarmonyOS® system. In a possible implementation, the first gesture may be a one-finger swipe gesture. As shown in FIG. 4A, the terminal 1 determines, based on motion information that is of a one-finger touch point of the user and that is collected by a sensor, that the first gesture is a one-finger swipe gesture, and gradually scales down a current page while a finger is sliding. After moving to a specific touch target, the terminal 1 may display the current page in a floating window/floating bubble. A swipe direction may be upward, downward, leftward, or rightward. To implement cross-device task migration, a finger swipe direction is usually toward a position of an icon of the target device.

Optionally, the user may perform a touch and hold with one finger in a blank area of the page, to scale down the page and move the page to a specific touch target. The processor displays the current page in a floating window. The touch target is a preset interaction area.

Figure 4B:
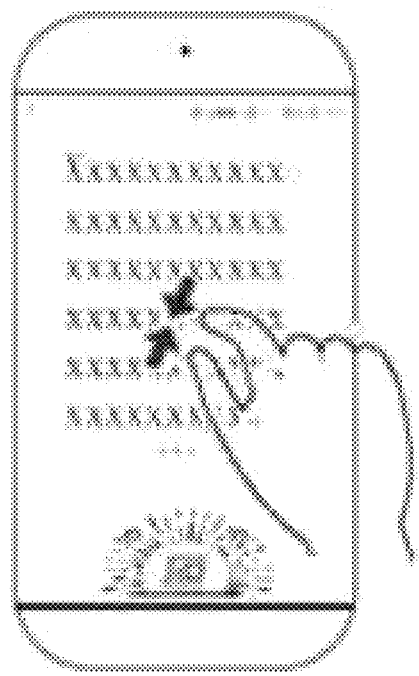
FIG. 4B is a schematic diagram of a two-finger pinch gesture according to Embodiment 1 of this application.

In a possible implementation, the first gesture may be a two-finger pinch gesture. As shown in FIG. 4B, the terminal 1 determines, based on user finger information collected by the sensor, that the first gesture of the user is a two-finger pinch gesture, and gradually scales down a current page or displays the current page in a floating window/floating bubble based on the two-finger pinch gesture.

When touch point information collected by the sensor is two touch points, and a distance between the two touch points on the display screen decreases in a period of time, the processor can determine that the touch gesture is a two-finger pinch gesture.

S302: The terminal 1 displays icons of nearby online devices, and determines a target device, where the target device is the terminal 2.

For example, the processor may obtain distance and direction information of another nearby online device by using a communication technology like sound wave, carrierless communication (ultra-wideband, UWB), wireless-fidelity (wireless fidelity, WiFi), or Bluetooth®, and determine a closest target device or a target device in a most matched direction.

Figure 4C:
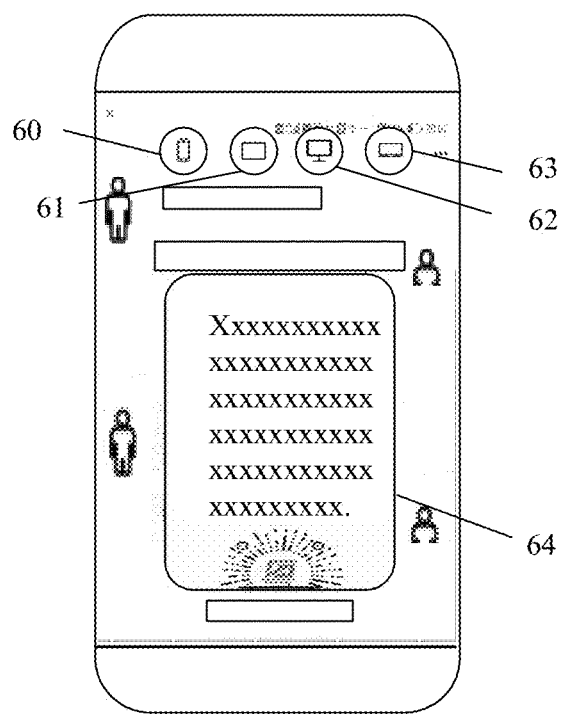
FIG. 4C is a schematic diagram of displaying icons of nearby devices on a top of a display screen of a terminal 1 according to Embodiment 1 of this application.

As shown in FIG. 4C, an icon 60 is a mobile phone, an icon 61 is a smart screen, an icon 62 is a desktop computer, an icon 63 is a notebook computer, and the icon 60 is the terminal 1. The nearby online device includes but is not limited to the foregoing devices.

For example, the terminal 1 may also be one of the following devices currently used by the user: a mobile phone, a desktop computer, a smart screen, a notebook computer, a relay device, or a smartwatch. The terminal 2 may be one of the following devices that communicate with the terminal 1 by using a wireless network or wired data: a mobile phone, a desktop computer, a smart screen, a notebook computer, a smart sound box, a smart television, or the like.

Devices identified by the icon 60, the icon 61, the icon 62, and the icon 63 communicate with each other through a wireless network or wired data, to form a super device.

In a possible implementation, when the current page is scaled down or displayed in the floating window/floating bubble, and the current page is moved to the preset touch target with a one-finger swipe, the processor may trigger a direction sensing technology to identify a nearby device, display an icon of the nearby online device at the top or another position of the display screen, and obtain information about a distance from and a direction of the nearby online device, to determine the target device.

In a possible implementation, the direction sensing technology may be always enabled to identify the nearby device. When the current page is scaled down or displayed in the floating window/floating bubble, or the current page is moved to the preset touch target with a one-finger swipe, an icon of the nearby online device is displayed on the top or another position of the display screen, and information about a distance from and a direction of the nearby online device is obtained, to determine the target device.

Figure 4D:
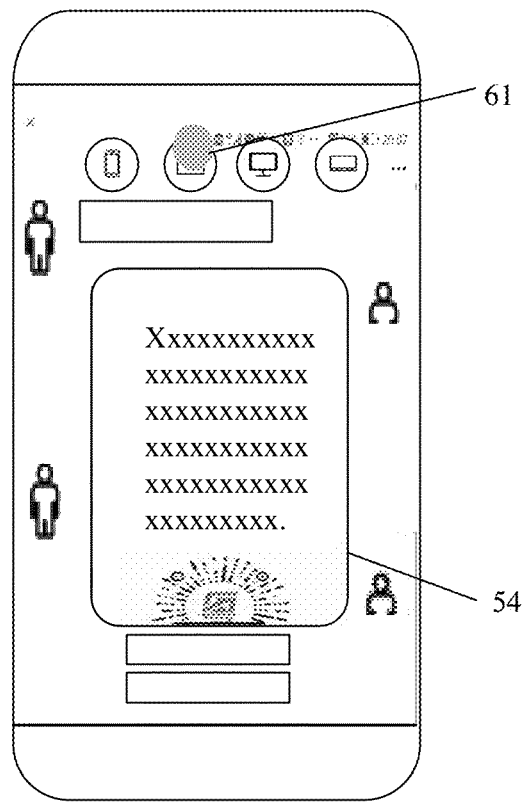
FIG. 4D is a schematic diagram of tapping a device icon to determine a target device according to Embodiment 1 of this application.

For example, as shown in FIG. 4D, in a scenario in which the user directly taps the icon 62 with one finger, the processor determines that the target device is a device corresponding to the icon 62. In this case, the one-finger tap gesture may be recorded as a second gesture.

Figure 4E:
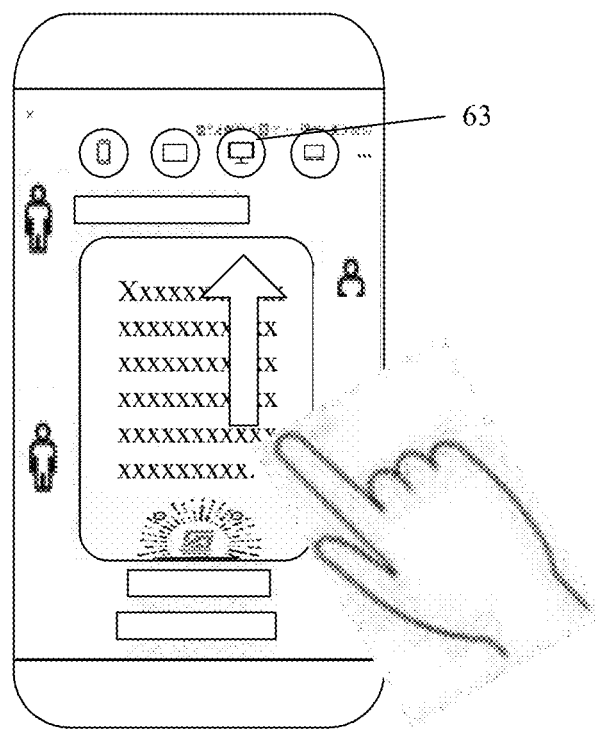
FIG. 4E is a schematic diagram of determining a target device by performing a touch and hold on a page and swiping toward a target device icon with one finger according to Embodiment 1 of this application.

For example, as shown in FIG. 4E, in a scenario in which the user performs a touch and hold with one finger on the current page, and swipes to a position of the icon 63, the processor determines that the target device is a device corresponding to the icon 63. An object on which the touch and hold is performed by the user with one finger may alternatively be a floating window or a floating bubble. In this case, the gesture of touch and hold with one finger may be recorded as the second gesture.

Figure 4F:
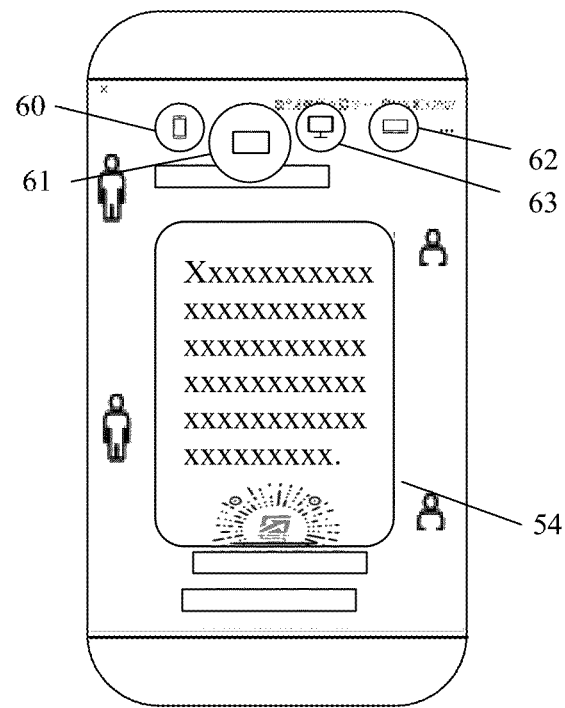
FIG. 4F is a schematic diagram of determining a target device by quickly pushing a scaled-down page upward to a touch target with one finger or a plurality of fingers and determining a target device icon through direction sensing according to Embodiment 1 of this application.

For example, as shown in FIG. 4F, when the current page is moved to a specific touch target through swipe, the processor performs direction sensing to determine the target device. For example, the processor identifies the closest device 61 in the front by using the direction sensing technology, and scales up or turns on an icon of the device 61. In this case, it is determined that the target device is a device corresponding to the icon 61 that is scaled up or turned on.

For example, after the current page is moved to the preset touch target through swipe, the processor calculates a confidence level of a nearby online device, and may calculate one of a distance confidence level, a direction confidence level, or a historical usage confidence level. An icon of an online device whose confidence level value is most matched or whose confidence level value meets a matching requirement is scaled up and displayed in the front of the display screen, and is turned on. In this case, it can be determined that the target device is the device whose confidence level value is most matched.

For example, when the processor identifies only one nearby online device with the direction sensing ability, it is determined that the device is the target device.

S303: Determine content for migration based on the scaled-down current page, and send the content to the target device based on the second gesture, or send the floating window/floating bubble corresponding to the current page to the target device.

The current page may be a full-screen page, a split-screen page, and/or a page with a floating window or a floating bubble of the terminal 1, and the content for migration may be a current full-screen page, split-screen page, floating window or floating bubble, and a corresponding running application. The corresponding running application on the current page may be a single application or applications running in parallel at a plurality of levels.

It should be understood that sending the current page to the corresponding target device is essentially task migration. The processor concurrently sends, to the target device, a running task corresponding to the current page. In this way, cross-device task migration of any content can be implemented.

In a possible implementation, the second gesture may be directly tapping the target device with one finger or a plurality of fingers. As shown in FIG. 4D, in a scenario in which the user directly taps the target device icon 62 with one finger or a plurality of fingers, the processor directly sends a scaled-down page 54 to the target device.

In a possible implementation, the second gesture may be touching and holding with one finger or a plurality of fingers and dragging toward a target device icon. As shown in FIG. 4E, in a scenario in which the user performs a touch and hold with one finger or a plurality of fingers and drags the scaled-down page 54 to a position of the target device icon 63, the processor sends the corresponding scaled-down page 54 to the corresponding target device.

Further, a task may be sent by performing a touch and hold with the second gesture in any area on the current page and then moving. The moving may be an upward swipe. The user may first tap any position or perform a touch and hold in a blank area of the page, for example, tap a blank area, a content area, or a bottom Tab area of the page with one finger, or perform a touch and hold on the page, and then drag the page to a position of a target device icon, to send the current page to the target device.

In a possible implementation, the second gesture may be a quick upward push with one finger or a plurality of fingers. As shown in FIG. 4F, after the processor identifies the closest device in the front by using the direction sensing technology, and the icon 61 of the device is scaled up and displayed, the processor may quickly send the page 54 to a device corresponding to the scaled-up icon 61 when the user performs a quick upward push on the scaled-down page 54 with one finger or a plurality of fingers.

The scaled-down page 54 in the foregoing implementations may alternatively be the page 54 displayed in the floating window or floating bubble.

Figure 4G:
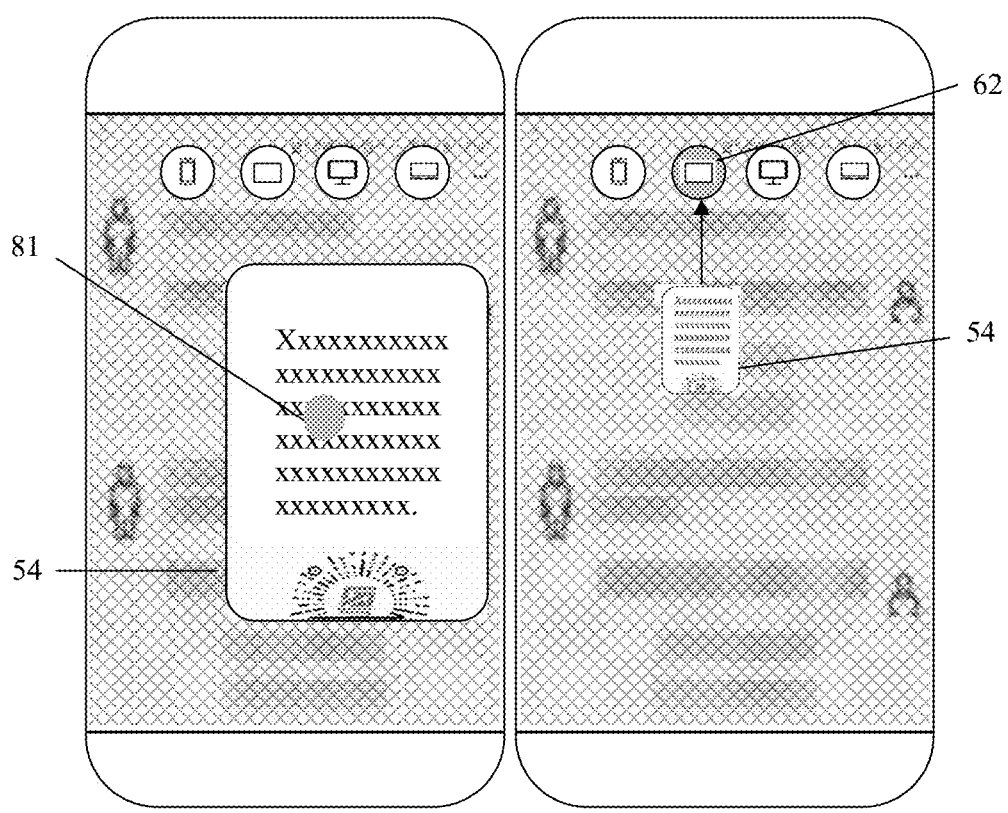
FIG. 4G is a schematic diagram of sending a task by performing a touch and hold with one finger in any area on a page and swiping toward a target device icon according to Embodiment 1 of this application.

As shown in FIG. 4G, the user performs a touch and hold on a position 81 of the page 54 with one finger and drags the page to a position of the target device icon 62, and the processor gradually scales down the page 54 during the touch and hold with one finger and sends the page 54 to the target device. The position 81 is any position on the page 54.

For example, when the page 54 is scaled down, and the user performs a touch and hold on the page 54 with one finger and performs a quick swipe toward the scaled-up icon, the processor sends the page 54 to a target device corresponding to the scaled-up icon.

For example, when there is only one nearby device, the device is the target device. In this case, the user only needs to perform one one-finger swipe gesture, and then the processor may quickly send the current page to the target device.

In a possible implementation, the user performs a touch and hold in a blank area of the page with one finger, and after the processor scales down the page 54, the processor displays the page 54 in the floating window or floating bubble when the finger of the user pushes leftward/rightward. The leftward/rightward push gesture of the finger may be recorded as a third gesture.

In a possible implementation, the first gesture may be a multi-finger pinch gesture. FIG. 5A to FIG. 5K provide example diagrams of performing cross-device task migration with a multi-finger pinch gesture. The following separately describes the different example diagrams with reference to a process of performing cross-device task migration with a multi-finger pinch gesture in FIG. 5L.

S401: A terminal 1 determines a multi-finger pinch gesture based on touch point information of a user's hand collected by a sensor, and scales down a current page based on the multi-finger pinch gesture, where the multi-finger pinch gesture indicates to start task migration.

Figure 5A:
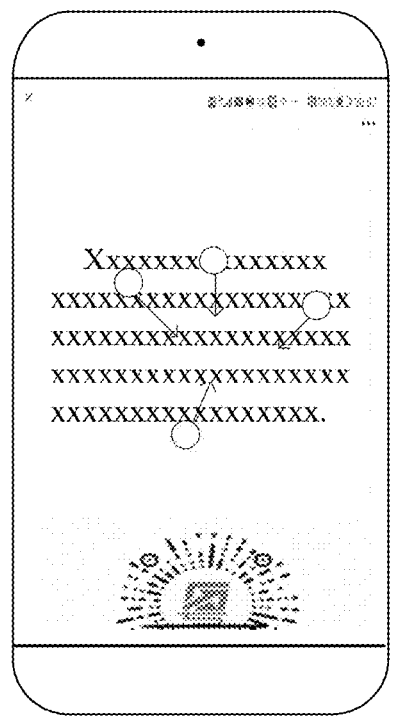
FIG. 5A is a diagram of a scenario of performing cross-device task migration with a multi-finger pinch gesture according to Embodiment 1 of this application.

For example, migration may be a process in which the terminal 1 sends a current page of the terminal 1 to a terminal 2, and an application of the terminal 2 automatically opens the current page. This is similar to WeChat sharing. Alternatively, a page may be sent to a corresponding target device by using an FA ability, and when a corresponding application like WeChat is not installed on the target device, a corresponding web page is opened by using an FA ability of a HarmonyOS® system. As shown in FIG. 5A, when the touch point information collected by the sensor is a plurality of touch points, and a distance between the plurality of touch points on a display screen decreases in a period of time, the processor determines that the touch gesture is a multi-finger pinch gesture. The multi-finger pinch gesture may also be a three-finger pinch gesture, a four-finger pinch gesture, or a five-finger pinch gesture.

Because task levels of pages on which gesture touch points are located are different, previous-level pages displayed by the processor on the background layer are different.

Figure 5B:
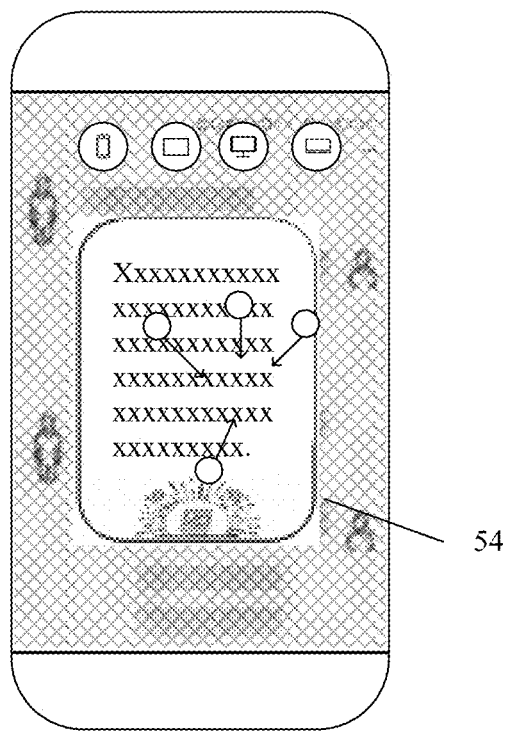
FIG. 5B is a schematic diagram of displaying a semi-transparent pervious-level page on a background layer of a scaled-down page according to Embodiment 1 of this application.

For example, as shown in FIG. 5B, if a user performs a multi-finger pinch gesture at a child layer of an application, the processor scales down a page that the subtask is on, and a semi-transparent previous-level page is displayed on a background layer. For example, when the user browses a linked web page after opening a WeChat chat interface, and performs a multi-finger pinch gesture on the linked web page, the processor scales down the browsed web page, and displays the transparent WeChat chat interface on a background layer.

Figure 5C:
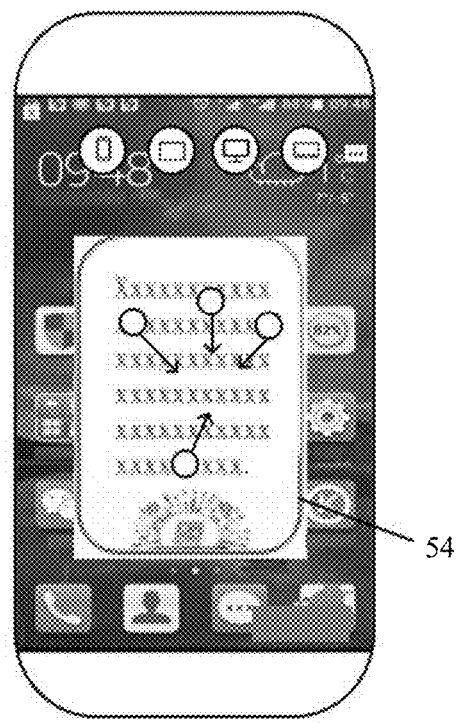
FIG. 5C is a schematic diagram of displaying a transparent home screen on a background layer of a scaled-down page according to Embodiment 1 of this application.

For example, as shown in FIG. 5C, if the user performs a multi-finger pinch gesture at a first layer of an application, the processor scales down the current page, and displays a transparent home screen on the background layer. For example, on an opened WeChat chat interface, the user performs a multi-finger pinch on a display screen. When the processor senses the gesture, the processor scales down the current WeChat chat interface, and displays a transparent home screen on the background layer.

In a possible implementation, a current page at a current level is scaled down based on a motion speed of a gesture on the current page. For example, if the pinch gesture of the user is a slow pinch, when sensing the gesture, the processor may slowly scale down the current page, and display a transparent/semi-transparent previous-level page on the background layer.

For example, when the sensor detects that a position change value of a plurality of touch points on the display screen is less than a set position change threshold within a set time threshold, the processor may accordingly determine that a gesture is a slow pinch gesture and gradually scale down the page, and then display a semi-transparent previous-level page on the background layer.

Figure 5D:
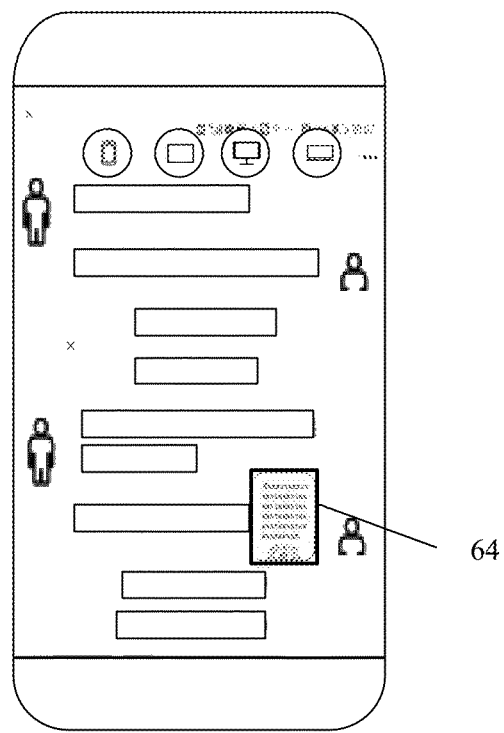
FIG. 5D is a schematic diagram of displaying a transparent pervious-level page on a background layer of a floating window according to Embodiment 1 of this application.

In a possible implementation, when the pinch gesture of the user is a quick multi-finger pinch, when sensing the gesture, the processor directly displays the page 54 in a floating window 64. As shown in FIG. 5D, a transparent previous-level page is displayed on the background layer of the floating window 64.

For example, when the sensor detects that a position change value of a plurality of touch points on the display screen is greater than a set position change threshold within a set time threshold, the processor may accordingly determine that a gesture is a quick pinch gesture and directly turn the page into the floating window 64, and then display a transparent previous-level page on the background layer.

Figure 5E:
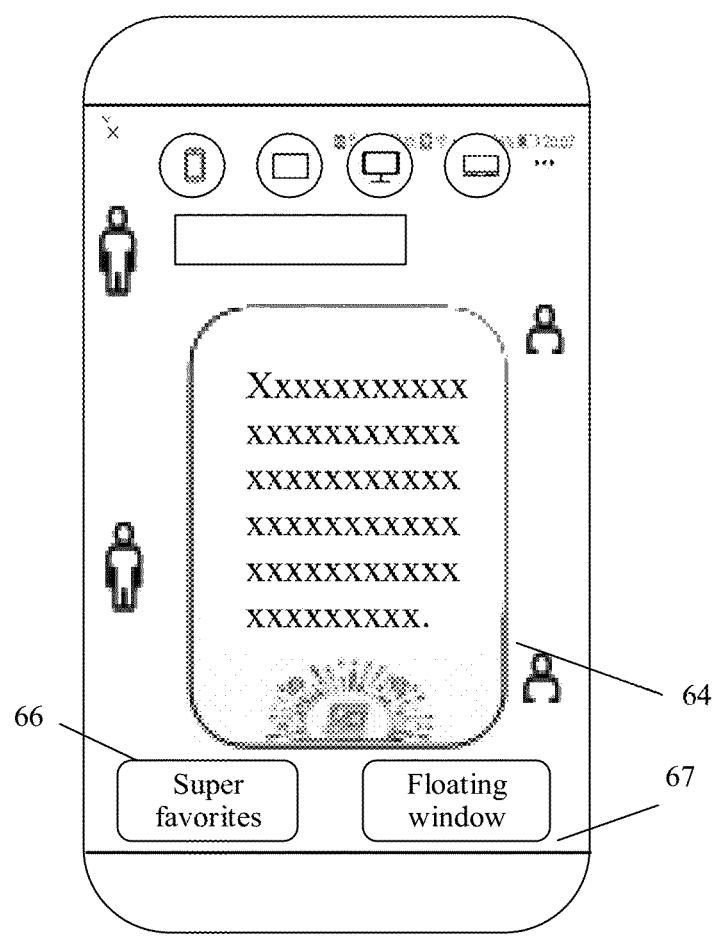
FIG. 5E is a schematic diagram of displaying a super favorites icon and a floating window icon that correspond to a current page according to Embodiment 1 of this application.

Optionally, as shown in FIG. 5E, when a quick multi-finger pinch is performed on the current page, a super favorites icon 66 and a floating window icon 67 may be displayed at the bottom of the current page. When the user taps the super favorites icon 66, the processor adds the current page to a shared super favorites folder on a cloud, and the target device can open the current page in the super favorites folder. When the user taps the floating window icon 67, the processor turns the current page to the floating window 64 for display.

In a possible implementation, when a multi-finger pinch gesture slides to a touch target, the scaled-down current page is displayed in the floating window/floating bubble, where the touch target is a preset interaction area. For example, if a swipe distance of the multi-finger pinch gesture of the user is long, when sensing that the gesture reaches the set touch target, the processor may scale down the current page, and display a transparent/semi-transparent previous-level page on the background layer.

S402: When the current page is scaled down, a device icon identifying a nearby device is displayed on the top of the display screen, and a target device is determined.

In a possible implementation, when the current page is scaled down or displayed in the floating window/floating bubble, and the current page is moved to the preset touch target with a one-finger swipe, the processor may trigger a direction sensing technology to identify a nearby device, display an icon of the nearby online device at the top or another position of the display screen, and obtain information about a distance from and a direction of the nearby online device, to determine the target device.

In a possible implementation, the direction sensing technology may be always enabled on the terminal 1 to identify the nearby device. When the current page is scaled down or displayed in the floating window/floating bubble, or the current page is moved to the preset touch target with a one-finger swipe, an icon of the nearby online device is displayed on the top or another position of the display screen, and information about a distance from and a direction of the nearby online device is obtained, to determine the target device.

Figure 5F:
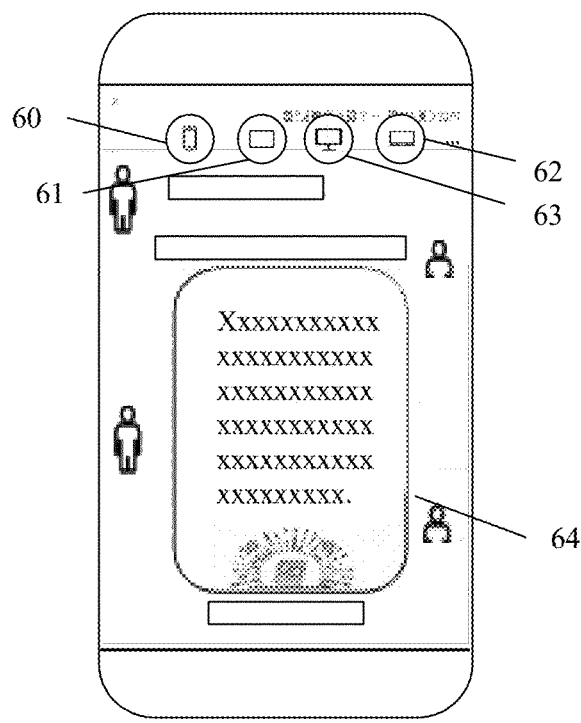
FIG. 5F is a schematic diagram of horizontally arranging device icons based on distances of identified devices according to Embodiment 1 of this application.

For example, as shown in FIG. 5F, device icons may be arranged horizontally based on distances of identified devices, or may be arranged in an arc shape based on distances and directions of the identified devices.

Figure 5G:
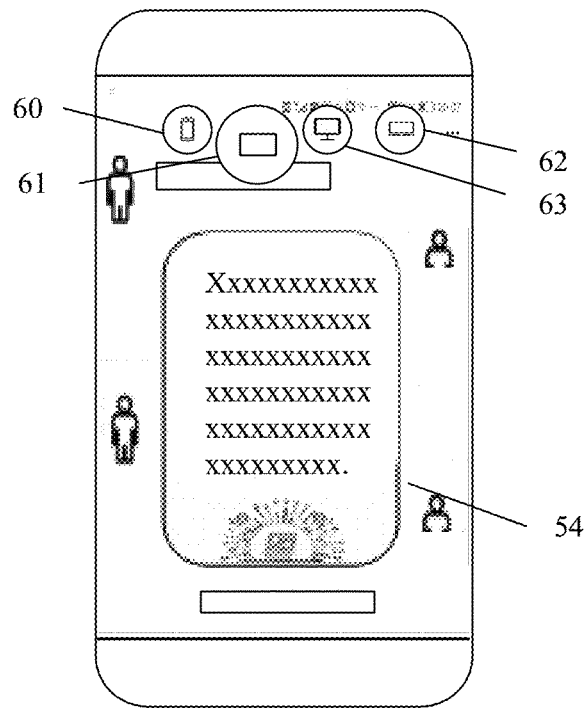
FIG. 5G is a schematic diagram of a target device icon that is scaled up and displayed according to Embodiment 1 of this application.

For example, as shown in FIG. 5G, the processor may determine, based on the distance or direction information, a device that is closest to the terminal 1 or that most matches the direction as the target device, and display a scaled-up icon, for example, the icon 61, in the front of the display screen of the terminal 1.

Figure 5H:
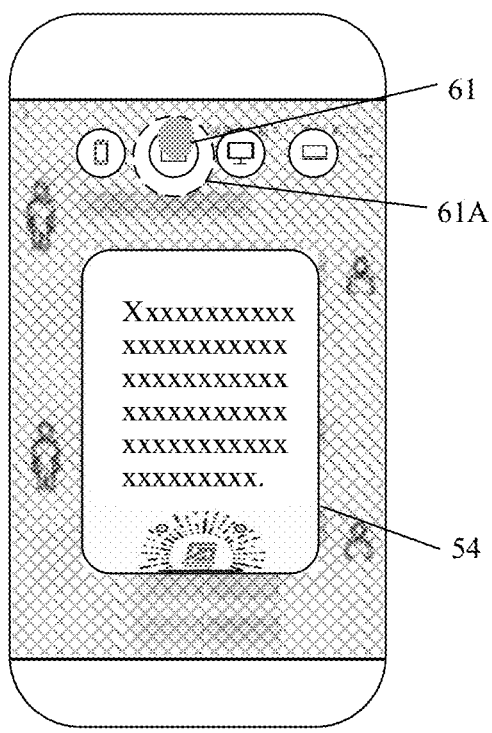
FIG. 5H is a schematic diagram of tapping a position of an icon to determine a target device according to Embodiment 1 of this application.

For example, as shown in FIG. 5H, the user may tap the position of the icon 61 to determine the target device. It may be understood that the user may also tap a position in a preset interaction area 61A (a touch target circle) of the device icon to determine the target device, or tap another icon or a position in another touch target circle to determine the target device.

For example, the processor may determine, based on content of the current page, the most matched target device in the nearby devices. For example, if the content of the current page 54 is a WPS document, the processor learns, by using a communication technology interaction message, that a Bluetooth device installed with a WPS application in the nearby devices is a device identified by the device icon 61, and determines that the device identified by the device icon 61 is the target device. Then the device icon 61 is scaled up or turned on in the front of the display screen of the terminal 1.

For example, the processor may determine, based on a task of a current page, the most matched target device in the nearby devices. For example, if the task of the current page 54 is to play a video, the processor may perform interaction by using a communication technology like Wi-Fi or Bluetooth®, to learn that a device that is closest to the terminal and that can play a video in the nearby devices is a smart television identified by the device icon 63. In this case, the processor determines that the smart television identified by the device icon 63 is the target device, and scales up the device icon 63 for displaying in the front of the display screen of the terminal 1.

For example, the terminal 1 may be rotated in an arrangement direction of device icons on the display screen; the target device is determined through alignment by using a UWB technology; and an icon of the target device is scaled up and displayed in the front of the display screen of the terminal 1.

According to the cross-device task migration method in Embodiment 1 of this application, a distance and a direction of nearby online device can be automatically identified by using a direction sensing ability, and a target device to which a current task is sent can be automatically determined.

S403: Determine that a task corresponding to the current page is a current task, and send the current task to the target device, or send a floating window/floating bubble corresponding to the current page to the target device.

Figure 5I:
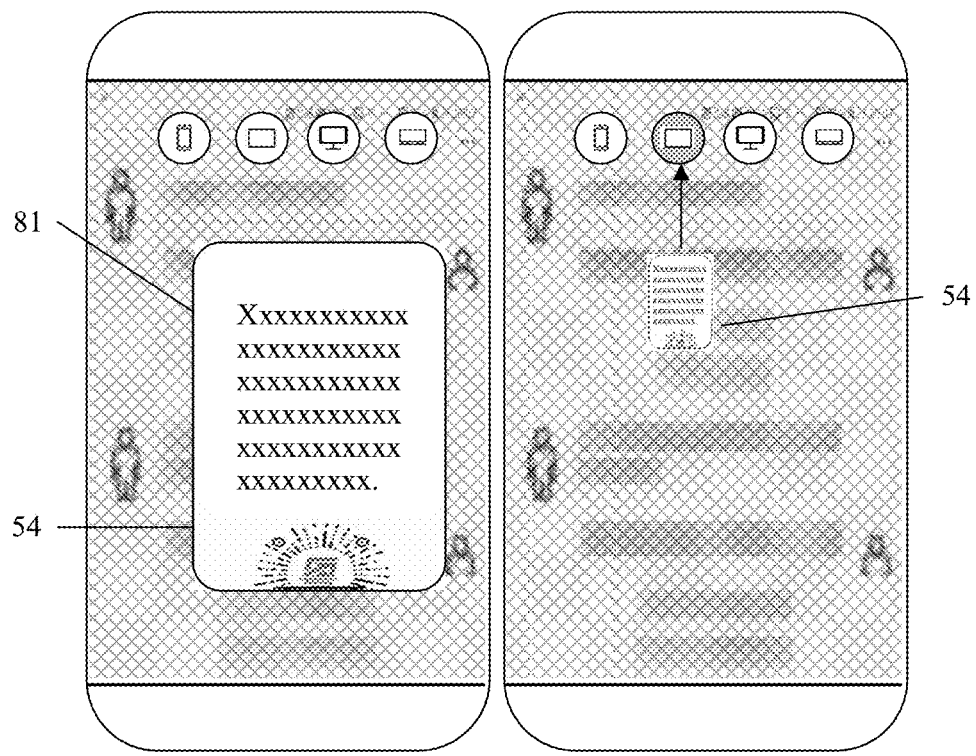
FIG. 5I is a schematic diagram of performing a touch and hold with one finger to extract a content area, and dragging the extracted content area to a target device according to Embodiment 1 of this application.

For example, after the user performs the multi-finger pinch to scale down the current page as shown in FIG. 5I, content of a corresponding area is extracted based on a position at which a touch and hold is performed with one finger or a plurality of fingers, and the content is dragged to a target device icon. The processor determines that the content of the corresponding area is the current task, and sends the current task to the target device.

Figure 5J:
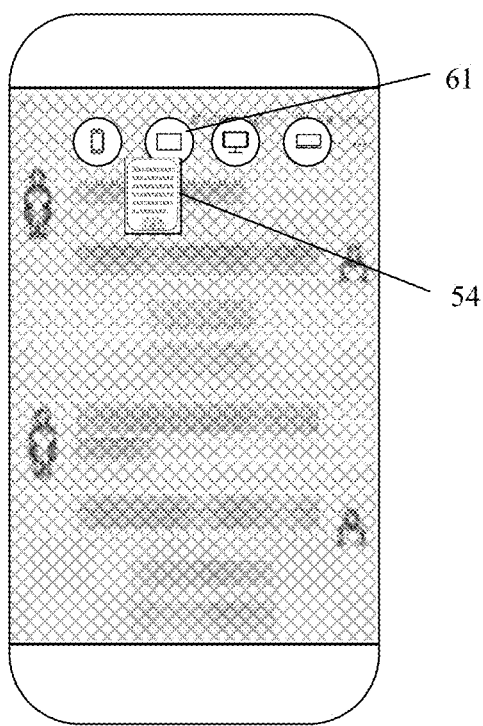
FIG. 5J is a schematic diagram of displaying a semi-transparent pervious-level page on a background layer according to Embodiment 1 of this application.

For example, after the scaled-down page 54 is dragged to a position of a target device icon as shown in FIG. 5J, a transparent previous-level page is displayed on the background layer.

Figure 5K:
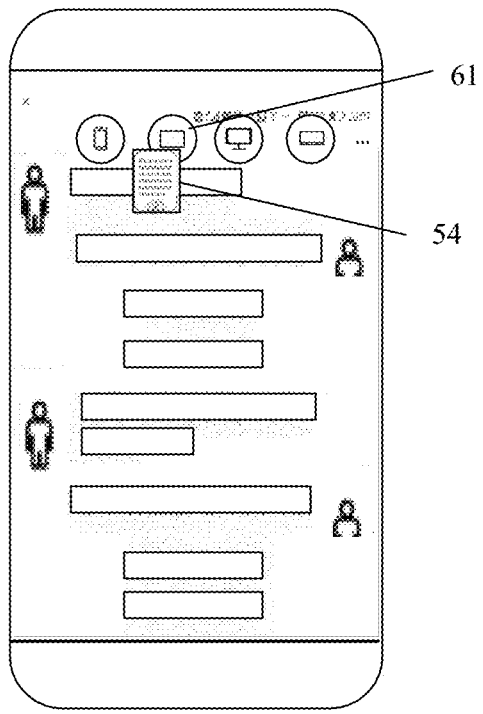
FIG. 5K is a schematic diagram of displaying a transparent pervious-level page on a background layer after a floating window is sent to a target device according to Embodiment 1 of this application.
Figure 5L:
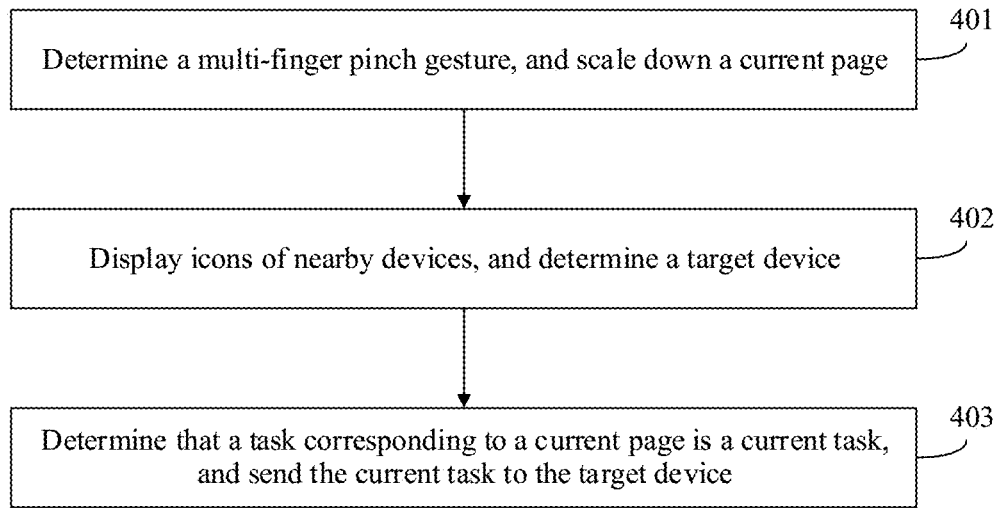
FIG. 5L is a flowchart of a method for performing cross-device task migration with a multi-finger pinch gesture according to Embodiment 1 of this application.

For example, when the current page 54 is a floating window as shown in FIG. 5K, after the floating window is sent to the position of the target device icon, a transparent previous-level page is displayed on the background layer.

For example, if there is a previous-level page of the page 54 on the terminal 1, after the task is sent, the previous-level page is displayed on the display screen of the terminal 1; or if there is no previous-level page of the page 54, a home screen is displayed.

Alternatively, the first gesture may be a multi-finger swipe gesture. The user may also send any content across devices with a multi-finger swipe gesture. FIG. 6A to FIG. 6H provide example diagrams of performing cross-device task migration with a multi-finger swipe gesture. The following separately describes different example diagrams with reference to a flowchart of FIG. 6I.

S501: A processor obtains a multi-finger swipe gesture on a current page, and scales down the current page, where the multi-finger swipe gesture indicates to start task migration.

For example, migration may be a process in which a terminal 1 sends a current page of the terminal 1 to a terminal 2, and an application of the terminal 2 automatically opens the current page. This is similar to WeChat® sharing. Alternatively, a page may be sent to a corresponding target device by using an FA ability, and when a corresponding application like WeChat is not installed on the target device, a corresponding web page is opened by using an FA ability of a HarmonyOS® system.

In a possible implementation, the terminal 1 determines the multi-finger swipe gesture based on motion information that is of touch points of fingers of the user and that is collected by a sensor, and scales down the current page based on the swipe of the fingers.

For example, the touch point information collected by the sensor may be one touch point or a plurality of touch points, and the processor can determine, based on the touch point information, that a quantity of fingers on the touchscreen.

Further, the processor can determine a swipe gesture based on a position change of the touch point within a period of time. In this way, it can be determined whether the gesture of the user is a one-finger swipe gesture or a multi-finger swipe gesture.

Figure 6A:
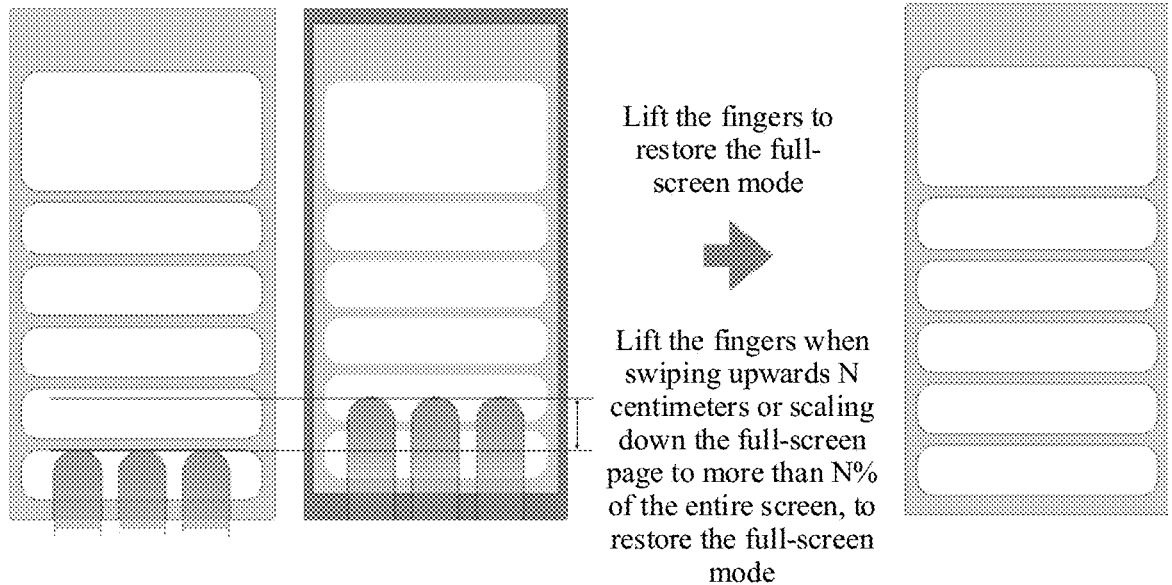
FIG. 6A is a schematic diagram of restoring a full-screen mode when a multi-finger swipe gesture is released during swipe according to Embodiment 1 of this application.

For example, as shown in FIG. 6A, fingers slide N centimeters in a multi-finger swipe gesture, or the fingers slide until the full-screen page is scaled down to more than N % of the entire screen, where N is a natural number. Then the user lifts the fingers. In this case, the processor enables the terminal 1 to restore a full-screen mode.

Figure 6B:
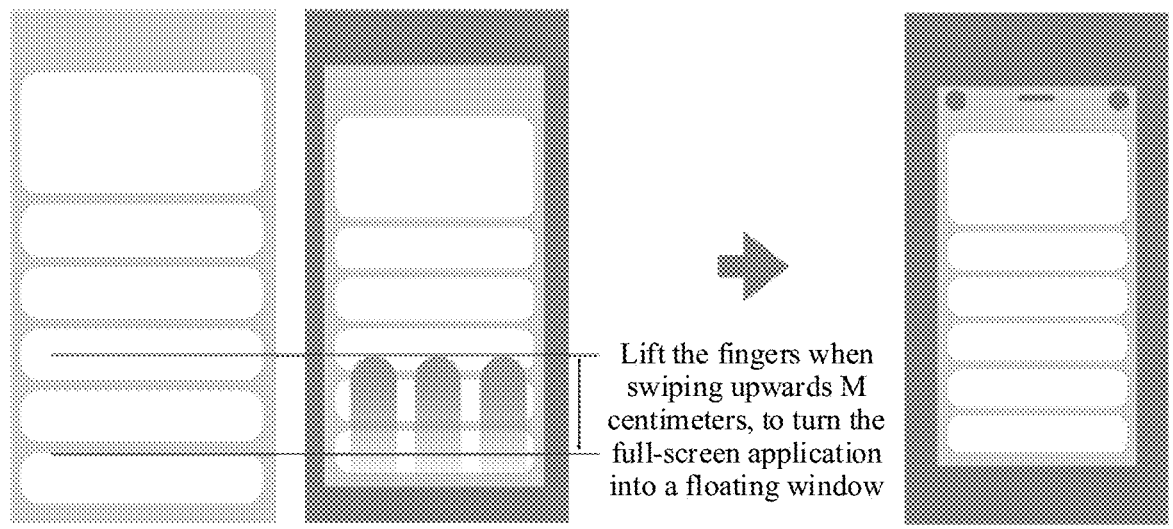
FIG. 6B is a schematic diagram of restoring a full-screen mode when a multi-finger swipe gesture is released during swipe according to Embodiment 1 of this application.

As shown in FIG. 6B, when the user keeps a multi-finger swipe gesture and lifts fingers after sliding M centimeters, the processor turns a full-screen application of the terminal 1 into a floating window, where N is smaller than M.

S502: When the multi-finger swipe gesture reaches a touch target of the screen, an icon of a nearby online device is displayed on the top of the touchscreen, and the processor determines the target device.

Figure 6C:
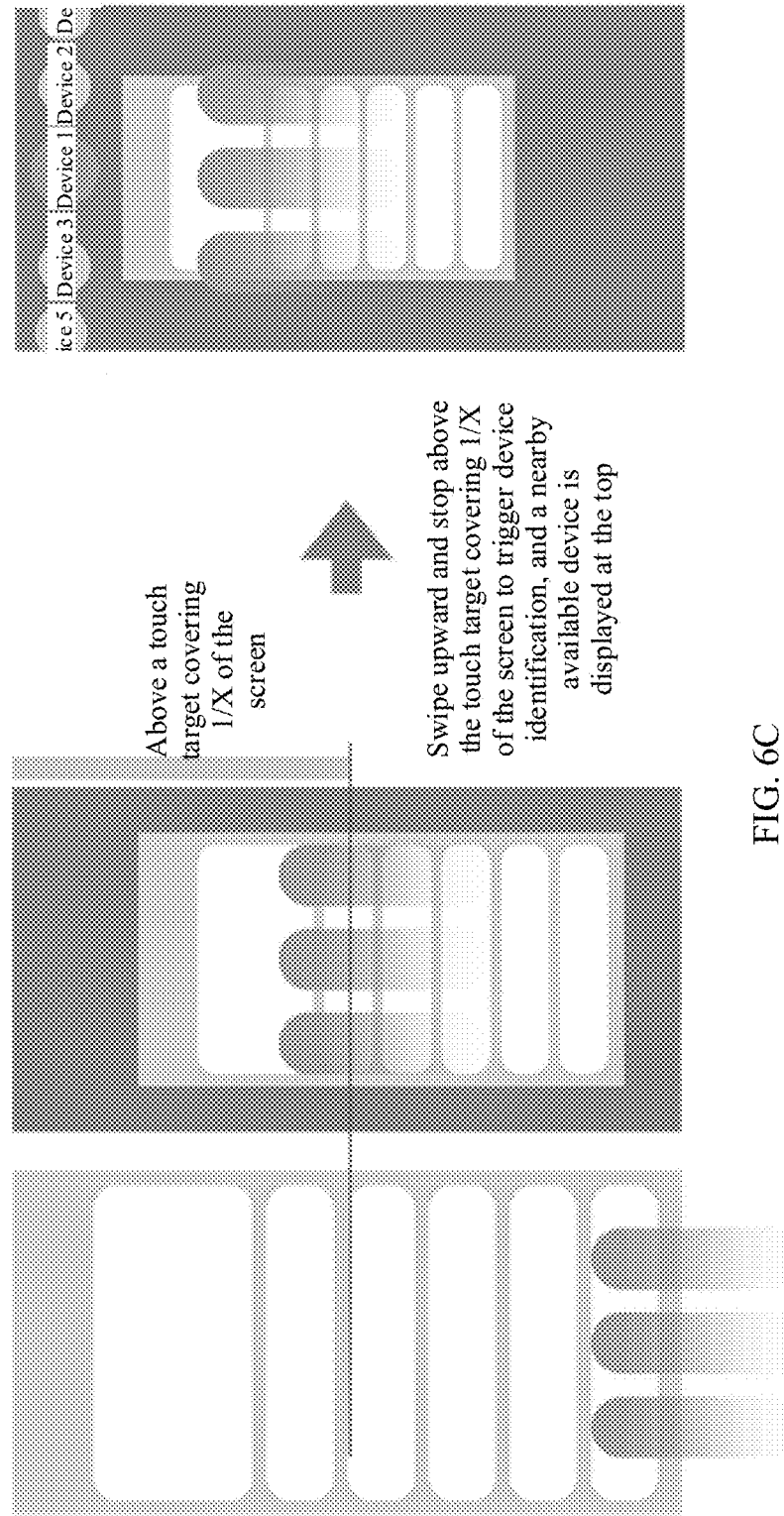
FIG. 6C is a schematic diagram of displaying, by a processor, another nearby online device at a top of a screen when a multi-finger swipe gesture enters a touch target covering 1/X of the screen according to Embodiment 1 of this application.

As shown in FIG. 6C, at the upper part of the touchscreen, the touch target occupies 1/X of the entire screen. When the multi-finger swipe gesture of the user enters the touch target covering 1/X of the screen, the processor determines a distance and a direction of the nearby device by using a direction sensing technology, and the nearby online device is displayed on the top of the screen, where X is a natural number.

In a possible implementation, the direction sensing technology may be always enabled to identify the nearby device. When the current page is scaled down or displayed in the floating window/floating bubble, or the current page is moved to the preset touch target with a multi-finger swipe, an icon of the nearby online device is displayed on the top or another position of the display screen, and information about a distance from and a direction of the nearby online device is obtained, to determine the target device.

The target device may be determined based on a confidence level that is determined based on historical usage. For example, a value indicating a historical usage confidence level may be calculated based on a quantity of times of device usage in the last day/week, and the target device is preset as a device that has a high value indicating the historical usage confidence level or a confidence level value meeting a matching requirement. The target device may be determined based on a confidence level that is determined based on a direction. For example, a value indicating a direction confidence level may be calculated based on a range that is in the front direction and that is between XX degrees to the front left and XX degrees to the front right, where XX is 0 to 180 degrees. The preset target device is a device whose confidence level value in the front direction is high or whose confidence level value meets a matching requirement.

In a possible implementation, as shown in FIG. 6C, an icon of a device with a highest confidence level may be displayed in the center by default, or the icon is turned on, or the icon is scaled up, so that the target device can be determined.

Figure 6D:
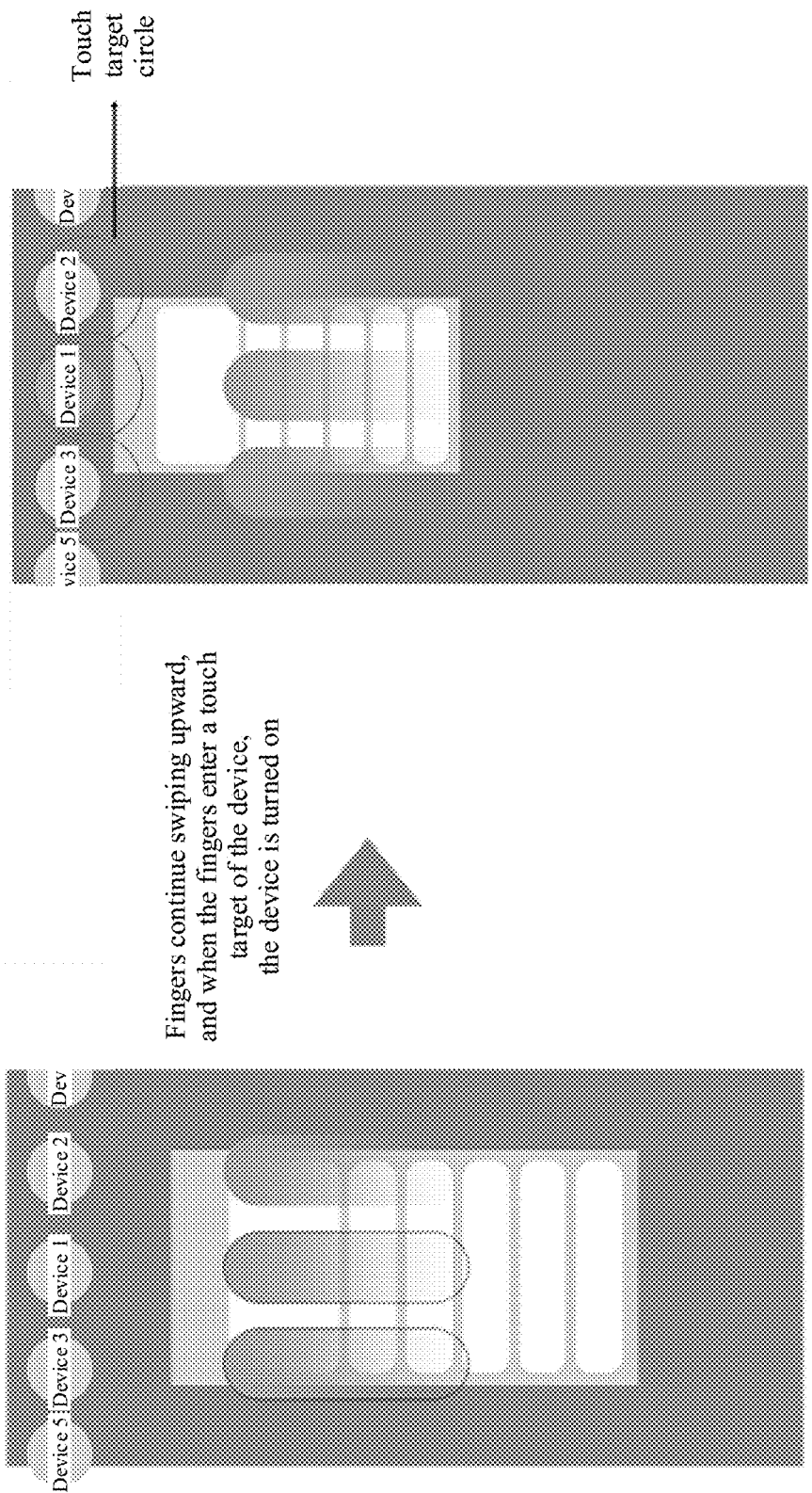
FIG. 6D is a schematic diagram of displaying, by a processor, only an icon of a nearby device when there is no nearby device with a highest confidence level according to Embodiment 1 of this application.

As shown in FIG. 6D, when the user's fingers in the multi-finger swipe gesture slide and enter the touch target covering 1/X of the screen, but there is no nearby device with the highest confidence level, the processor may display only the icon of the nearby device. The user's fingers may continue to swipe. When the user's fingers enter a touch target circle of the icon corresponding to the target device, the processor turns on the icon of the device. If the fingers enter touch target circles of icons of a plurality of devices, the processor turns on an icon of a device covering a largest area. In this way, the target device can be determined.

Figure 6E:
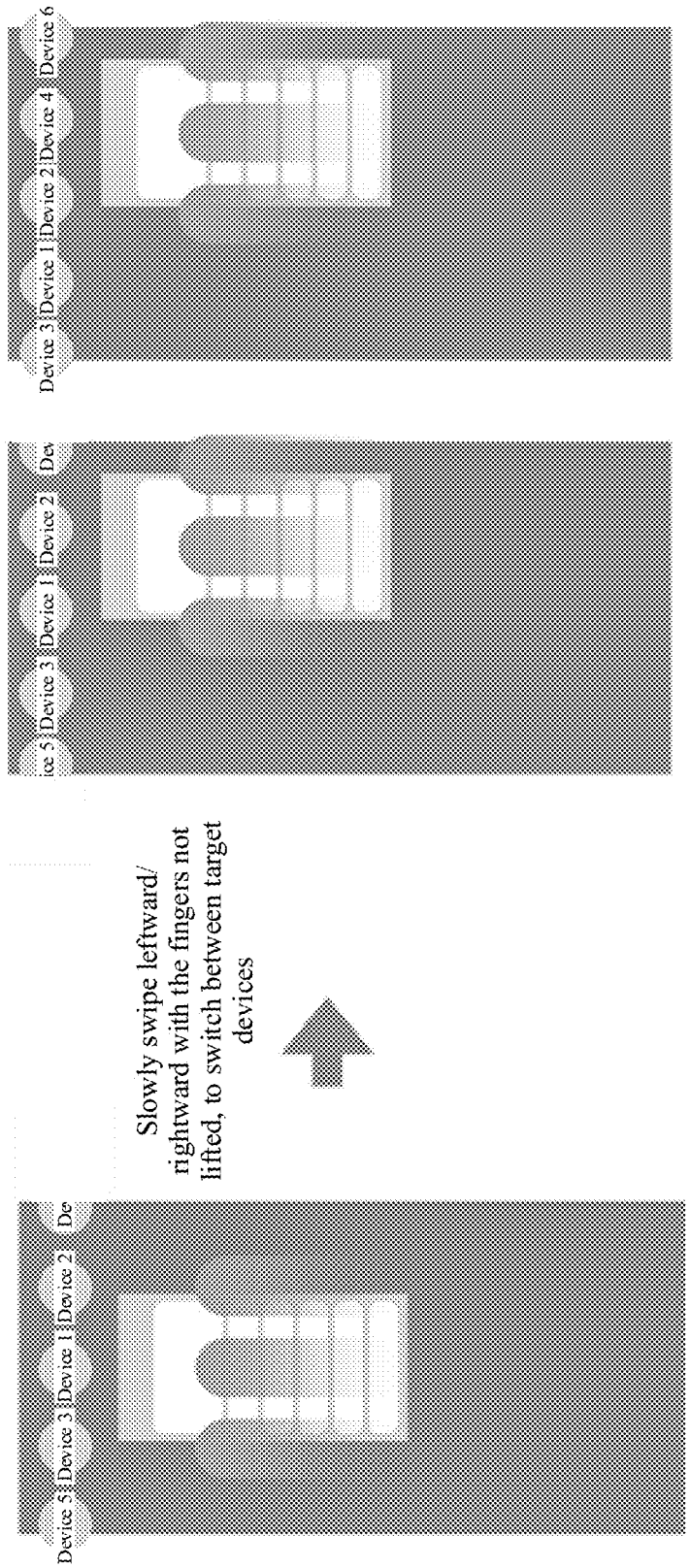
FIG. 6E is a schematic diagram of displaying icons of more devices during slow rightward movement according to Embodiment 1 of this application.

As shown in FIG. 6E, when an icon of a device is turned on, when the user's fingers are not lifted but slowly swipe left/right, the processor may switch to and turn on another target device icon. For example, when three fingers slowly move to the right, the processor switches to and turns on an icon of a device 2 on the right. When the three fingers continue to slowly move to the right, the processor switches to and turns on an icon of a device 4 on the right, and icons of more devices are displayed, for example, an icon of a device 6. A corresponding target device is determined based on a final turned-on icon.

Figure 6F:
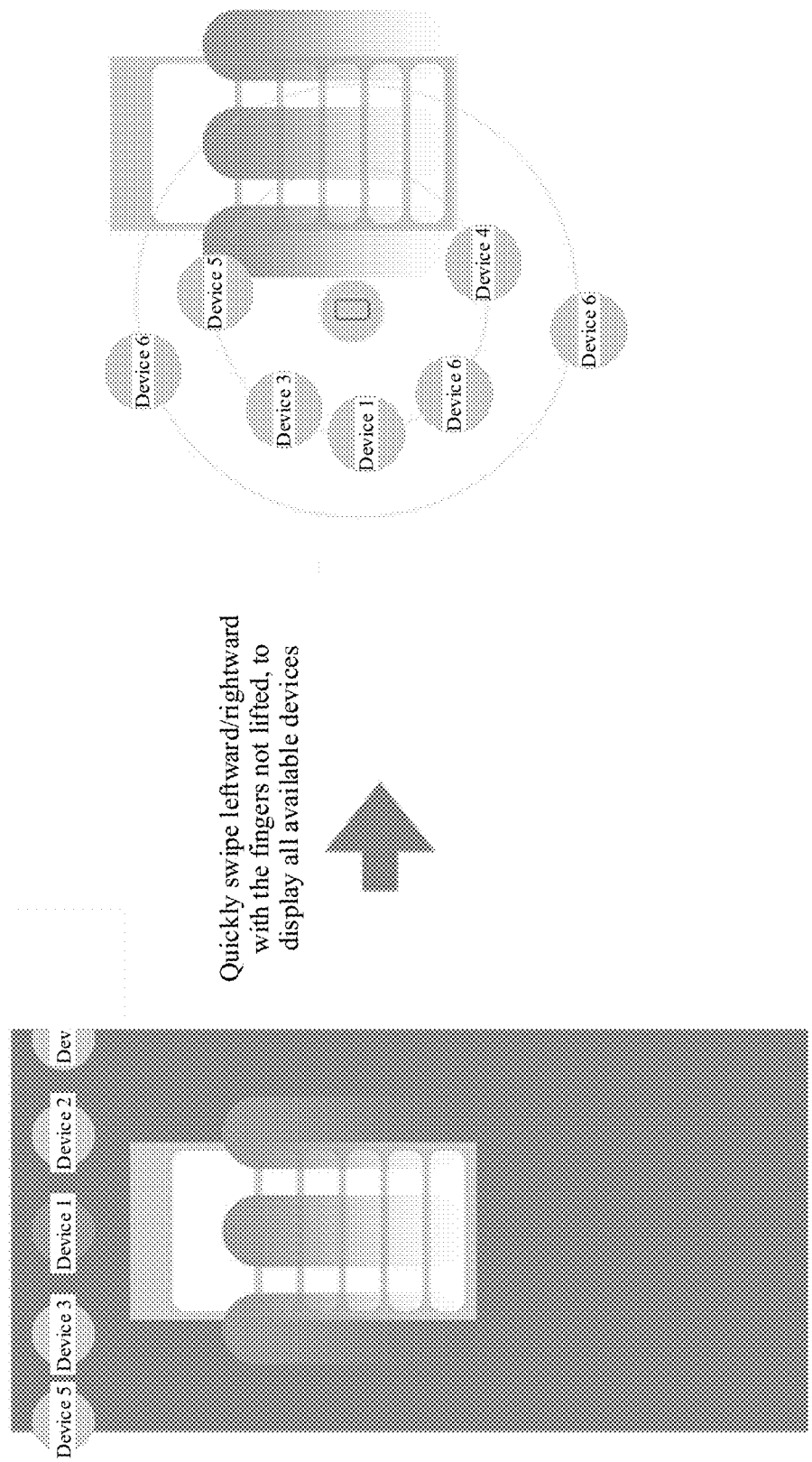
FIG. 6F is a schematic diagram of displaying all available nearby devices during fast rightward movement according to Embodiment 1 of this application.

As shown in FIG. 6F, after the current page is moved to a specific touch target, when an icon of a device is turned on, and the user's fingers are not lifted but quickly swipe left/right, the processor determines to display all available nearby devices 1 to 6 on the screen for target device selection.

Figure 6G:
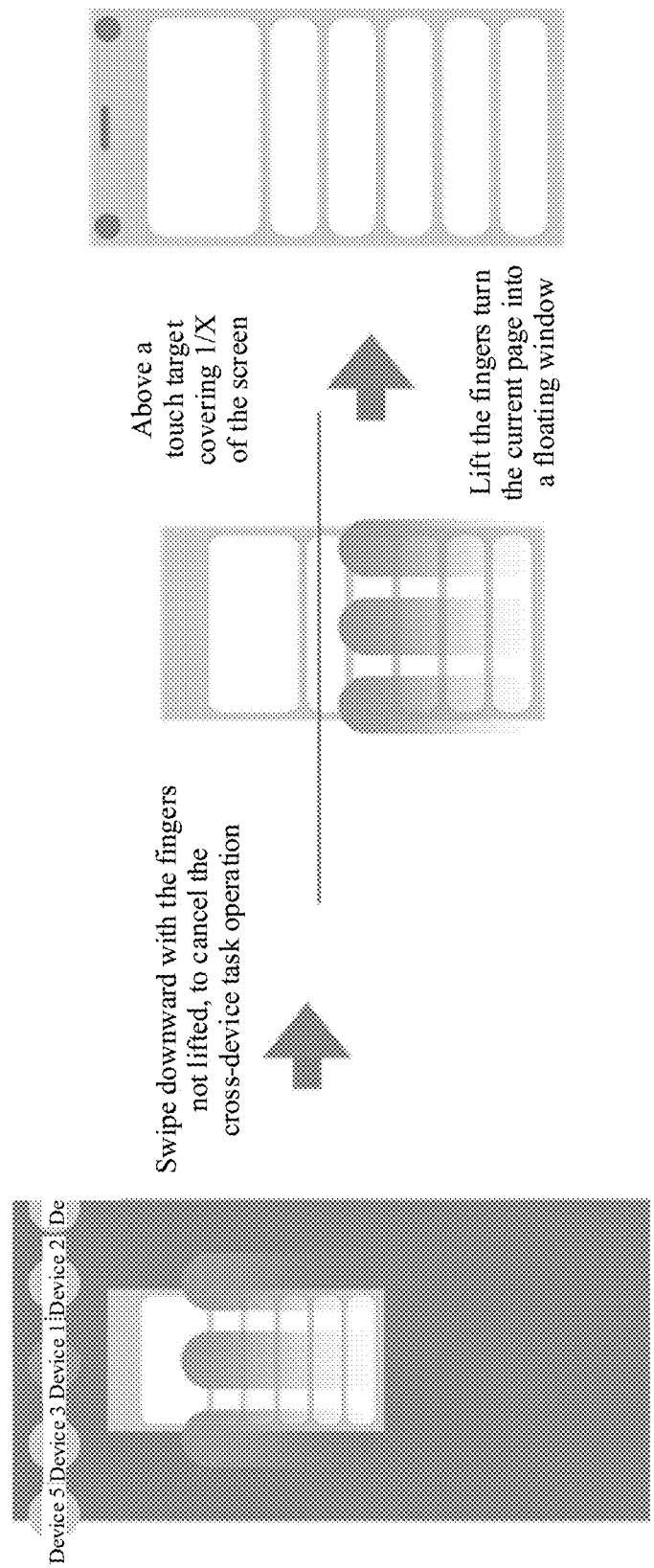
FIG. 6G is a schematic diagram of exiting a cross-device task sending state when swiping downward and stopping below a touch target on a current page according to Embodiment 1 of this application.

As shown in FIG. 6G, when an icon of a device is turned on, and the user's fingers are not lifted but swipe downward, the processor may cancel cross-device task sending. For example, when the three fingers of the user swipe downward and stop below the 1/X touch target of the current page, the processor may exit a cross-device task sending state; and when the fingers of the user are lifted, the processor may turn the current page into a floating window.

Figure 6H:
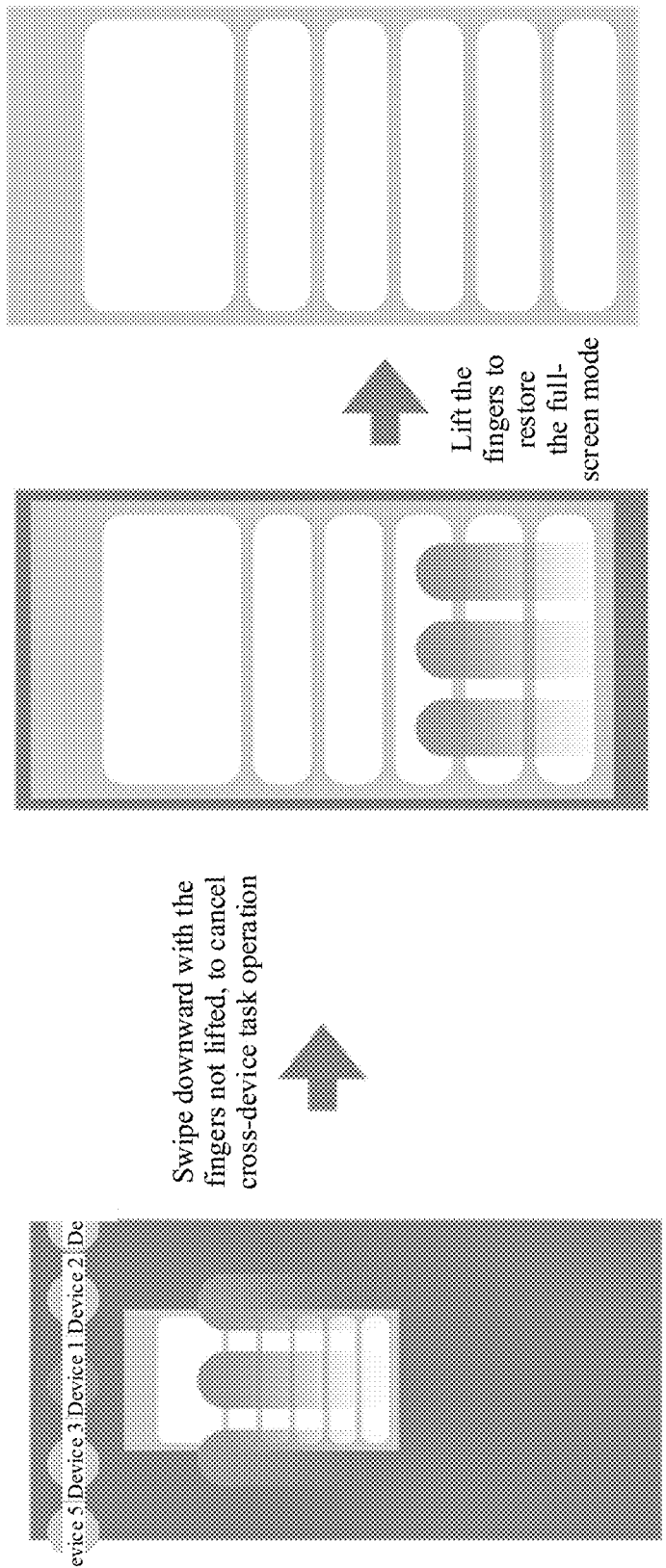
FIG. 6H is a schematic diagram of canceling cross-device task sending according to Embodiment 1 of this application.
Figure 6I:
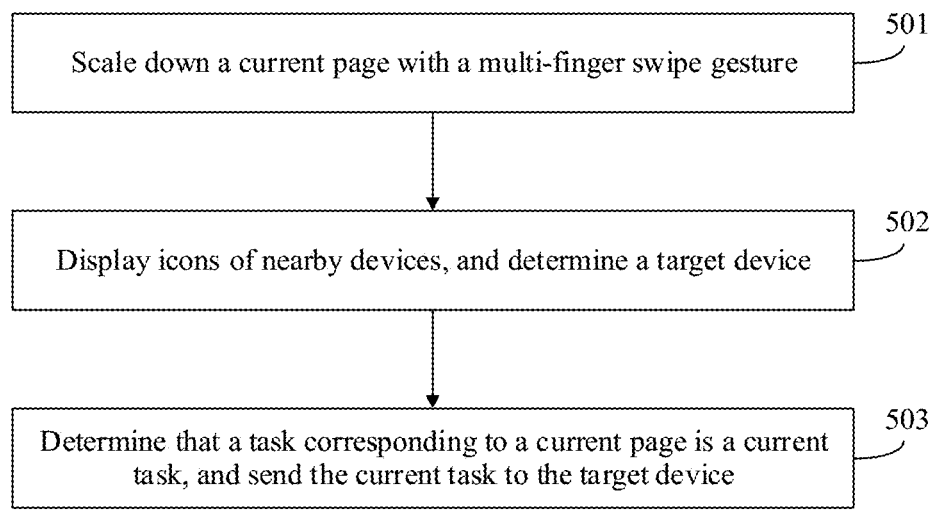
FIG. 6I is a flowchart of a method for performing cross-device task migration with a multi-finger swipe gesture according to Embodiment 1 of this application.

As shown in FIG. 6H, when an icon of the device 1 is turned on, and the user's fingers are not lifted but swipe downward, the processor may cancel cross-device task sending. For example, when the three fingers of the user swipe to move the scaled-down page to a position where the scaled-down page is less than N % of the entire screen, the user lifts the fingers, and the processor may restore to full-screen mode.

S503: The user moves the current page to a position of the icon of the target device, and the processor determines that a task corresponding to the current page is a current task, and sends the current task to the target device, or sends a floating window/floating bubble corresponding to the current page to the target device.

In step S301, S401, or S501, the cross-device task migration method provided in Embodiment 1 of this application can adapt to specific content preset in an application. The specific content includes one of the following: a floating window, an attachment, a picture, a video, a link, or a card.

Figure 6J:
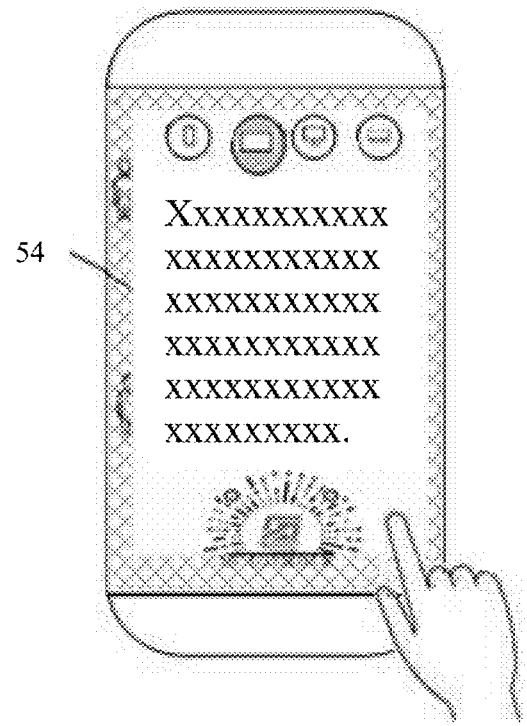
FIG. 6J is a schematic diagram of extracting corresponding specific content on a current page according to Embodiment 1 of this application.

In a possible implementation, a second gesture is used to migrate a task, and the second gesture may be a gesture of touch and hold and drag with one finger. As shown in FIG. 6J, a page is scaled down, a touch and hold is performed with one finger on specific content in the scaled-down page, and the page is dragged to the target device icon 61. In this case, the processor may extract corresponding specific content on the current page, and the processor sends the specific content to a corresponding target device.

Figure 6K:
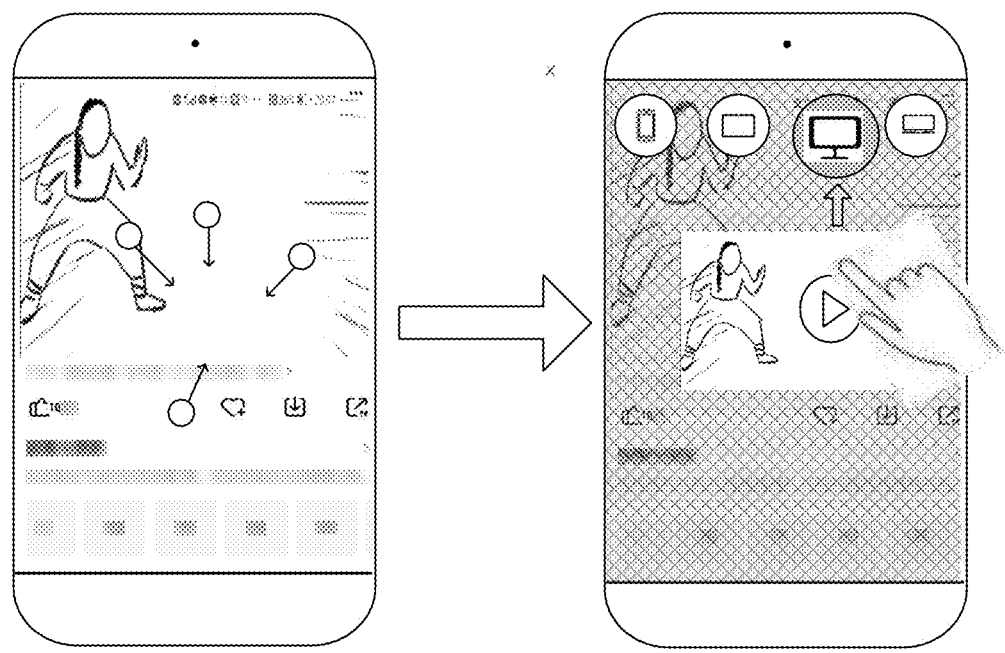
FIG. 6K is a schematic diagram of extracting content in a video format on an extracted page according to Embodiment 1 of this application.

For example, as shown in FIG. 6K, when the user performs a multi-finger pinch on the current page, the processor determines whether content in a video format exists in content on the current page, and if the content exists, the processor extracts the content in the video format on the page, and sends the extracted video to the target device. In another example, the format of the content extracted by the processor may alternatively be one or a combination of the following formats: a document, an attachment, a picture, audio, a link, a card, and the like.

Optionally, the second gesture may be a one-finger tap gesture. The processor may extract, based on a touch point position of one finger of the user on the touchscreen, content corresponding to the position, and send the content to the target device.

In the cross-device task migration method provided in Embodiment 1 of this application, for different target devices, task migration effects are different. For example, when the target device is a drag-and-drop device, for example, a mobile phone, a desktop computer, a smart screen, or a notebook computer, and a same application is installed, the application may be directly started on the target device through communication or remote control, and an operation like browsing, editing, or playing may be performed on a sent task on the target device. For example, the target device directly links and displays the page 54, and the user may scroll through the page, turn the page, and perform various editing operations on the page 54 on the target device.

For example, when the target device is a drag-and-drop device, like a mobile phone, a desktop computer, a smart screen, or a notebook computer, but no corresponding application is installed, the target device is used as a projection to mirror a task on the terminal 1. For example, the target device may directly display the page 54, and when the page 54 is scrolled through and turned on the terminal 1, the target device synchronously displays scrolling and page turning of the page 54.

For example, when the target device is not a drag-and-drop device, for example, a smart television or a smart sound box, after the processor of the terminal 1 completes task sending, the target device may be started through a remote control icon or a remote control connection of the terminal 1, and the sent task is displayed or played on the target device. For example, after the user drags a song being played by the terminal 1 to an icon of an intelligent sound box, the processor of the terminal 1 sends the song being played to the intelligent sound box. When the song is sent, the processor of the terminal 1 may start the intelligent sound box through a Bluetooth connection, and the intelligent sound box plays the received song.

Figure 7A:
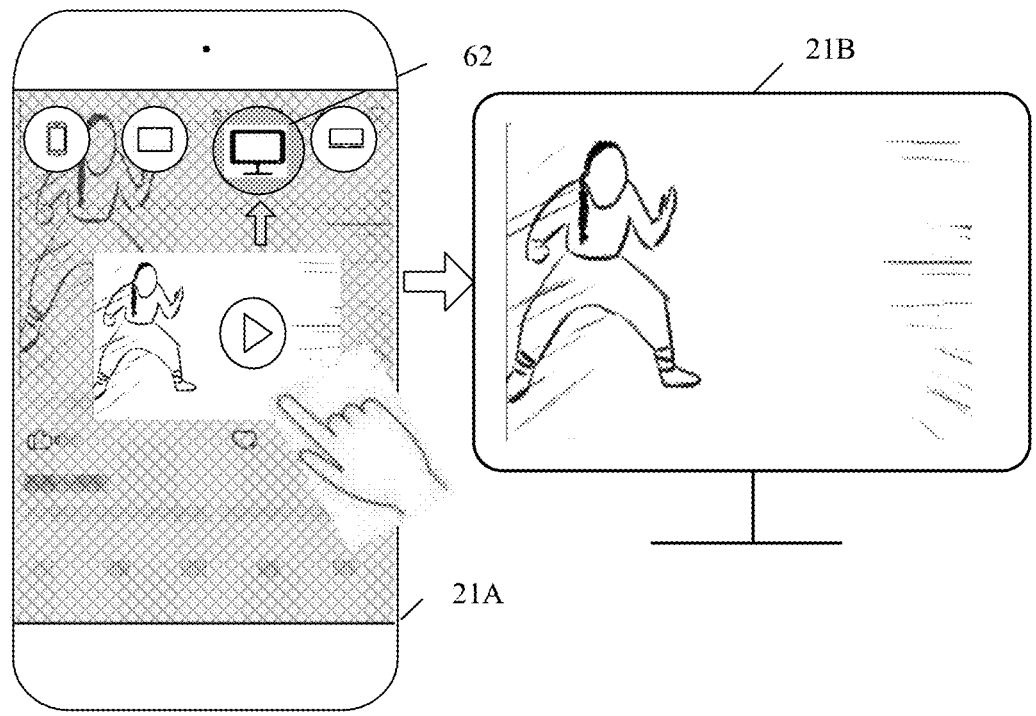
FIG. 7A is a schematic diagram of sending a partial screenshot of a current page to a target device according to Embodiment 1 of this application.

In a possible implementation, as shown in FIG. 7A, the processor may send a partial screenshot of the current page to a target device 21B corresponding to the icon 62, and may directly open the partial screenshot on the target device through communication or remote control.

Figure 7B:
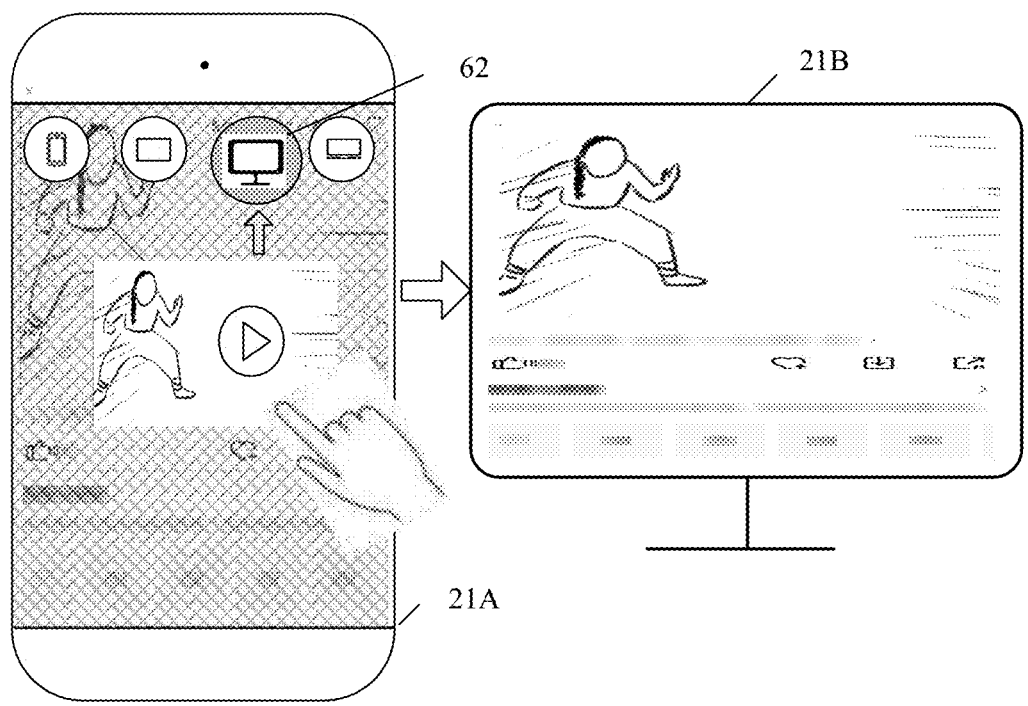
FIG. 7B is a schematic diagram of sending a complete scrolling screenshot of a current page to a target device according to Embodiment 1 of this application.

In a possible implementation, as shown in FIG. 7B, the processor may send a full-screen screenshot of the current page to a target device 21B corresponding to the icon 62, and may directly open the scrolling screenshot on the target device 21B through communication or remote control.

Figure 7C:
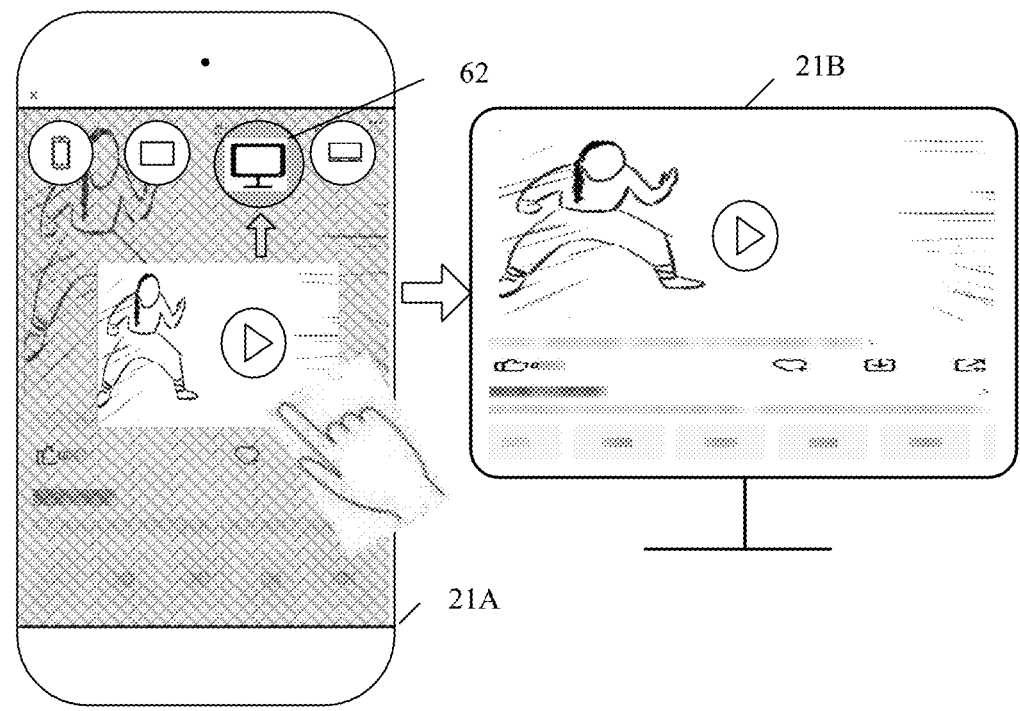
FIG. 7C is a schematic diagram of sending a link of a current page to a target device according to Embodiment 1 of this application.

In a possible implementation, as shown in FIG. 7C, the processor may send a link of the current page to the target device 21B corresponding to the icon 62, the target device 21B automatically opens the link and displays the current link, and the user may perform operations such as browsing, editing, and playing on a sent task on the target device.

After the processor sends the task to the target device 21B, if a display screen of the target device 21B is busy, the target device 21B displays the received page in a floating window; or if the screen of the target device 21B is idle, the target device 21B displays the received task in full screen.

It may be understood that, the display screen of the target device 21B being busy means that the entire display screen is occupied by at least one task, and that the screen of the target device 21B being idle means that the display screen is not fully occupied.

Figure 8A:
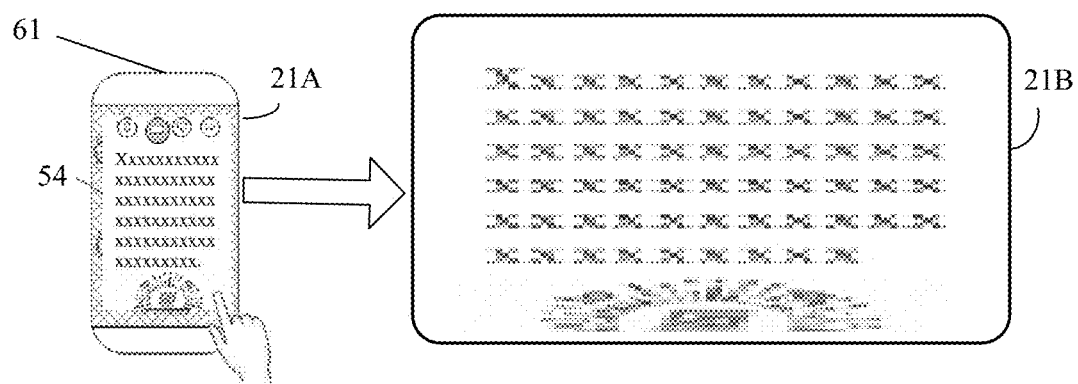
FIG. 8A is a schematic diagram in which a target device displays a received page in full screen according to Embodiment 1 of this application.

For example, as shown in FIG. 8A, after the processor sends the current page 54 to the target device 21B, when the target device 21B is not fully occupied, the target device 21B displays the received page in full screen.

Figure 8B:
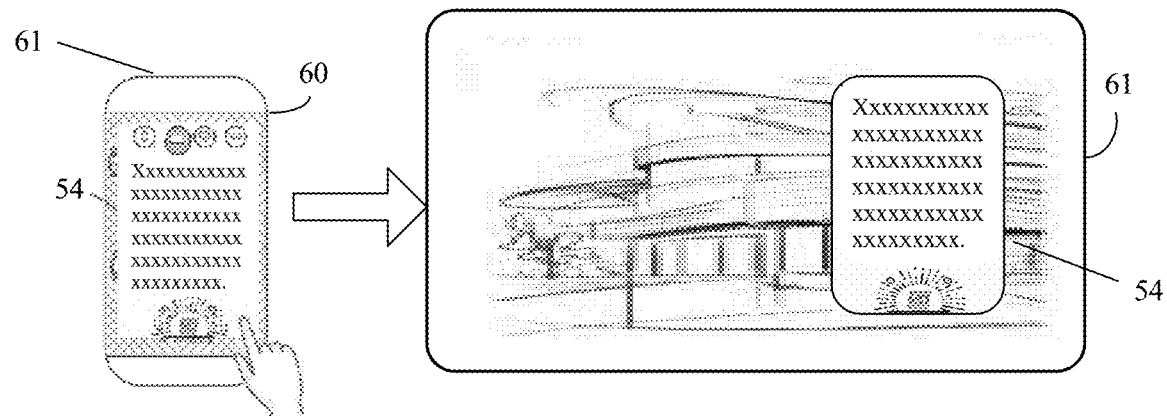
FIG. 8B is a schematic diagram in which a target device displays a received page in a floating window according to Embodiment 1 of this application.

Optionally, as shown in FIG. 8B, if the entire target device 21B is occupied by a task, the target device 21B may display the received page 54 in a floating window.

In a possible implementation, when the target device 21B adapts to the feature ability (feature ability, FA), the processor of the terminal 1 sends a task by using the FA, to send a minimum unit of an application corresponding to the current page of the terminal 1 to the target device 21B, and the target device 21B runs only the minimum unit of the application.

In a possible implementation, when the target device 21B does not adapt to a feature ability (feature ability, FA) application, after the processor of the terminal 1 sends a task by using the FA application, the target device 21B may display the received task on the display screen through mirroring.

In a possible implementation, if it takes a long time for the processor to implement feature ability (feature ability, FA), the target device 21B may first display a received page on the display screen through mirroring, and when the FA application is downloaded, the page is automatically turned to a minimum unit for running the task by using the FA, and a minimum unit of the task is displayed in real time.

Embodiment 2 of this application provides a cross-device task migration method. The processor can quickly scale down a current page or quickly generate floating windows of a plurality of tasks based on a multi-finger pinch gesture of a user, and send the floating windows to the target device 21B in a multi-task scenario.

In a possible implementation, due to a multi-finger pinch by the user at any position on the entire screen or a touch and hold with one finger in any blank area, any task may be sent across devices.

Figure 9A:
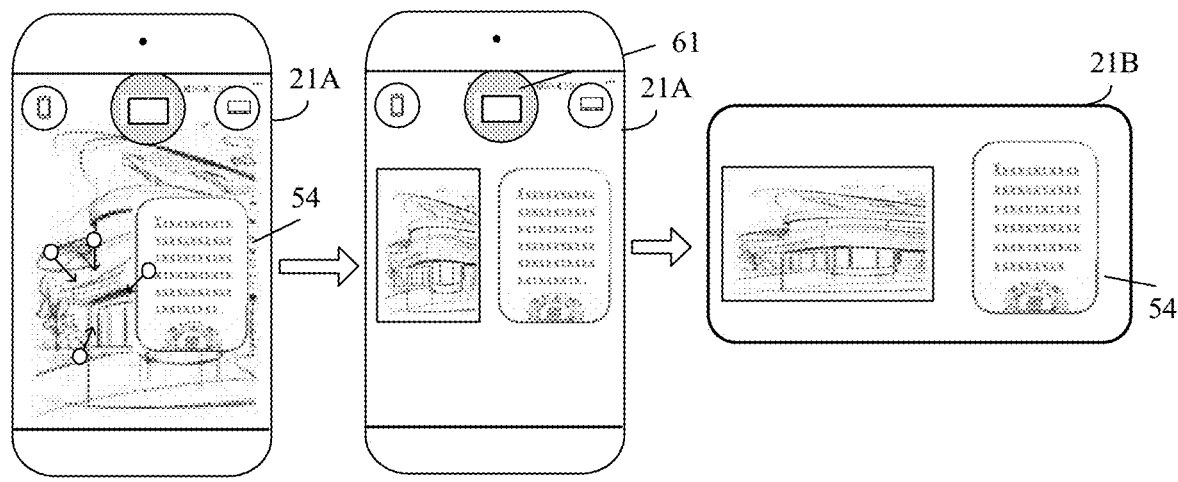
FIG. 9A is a schematic diagram of quickly sending two tasks, which are a full-screen task and a floating window task, to a target device in a multi-task scenario according to Embodiment 2 of this application.

For example, as shown in FIG. 9A, if a current page is a full-screen task and a floating window task, after the user performs a multi-finger pinch at any position on the screen, the processor generates scaled-down images of the two tasks on the current page. The user taps an icon 61 of the target device 21B, and the processor may send the two tasks to the target device 21B. Then the target device 21B generates two floating windows based on the received two tasks.

In a possible implementation, in a multi-task scenario, the processor can distinguish a task corresponding to a selected window area based on a first gesture of the user and send a task corresponding to the selected window area to the target device 21B, or the processor quickly scales down the current page, or the processor quickly generates a floating window.

Figure 9B:
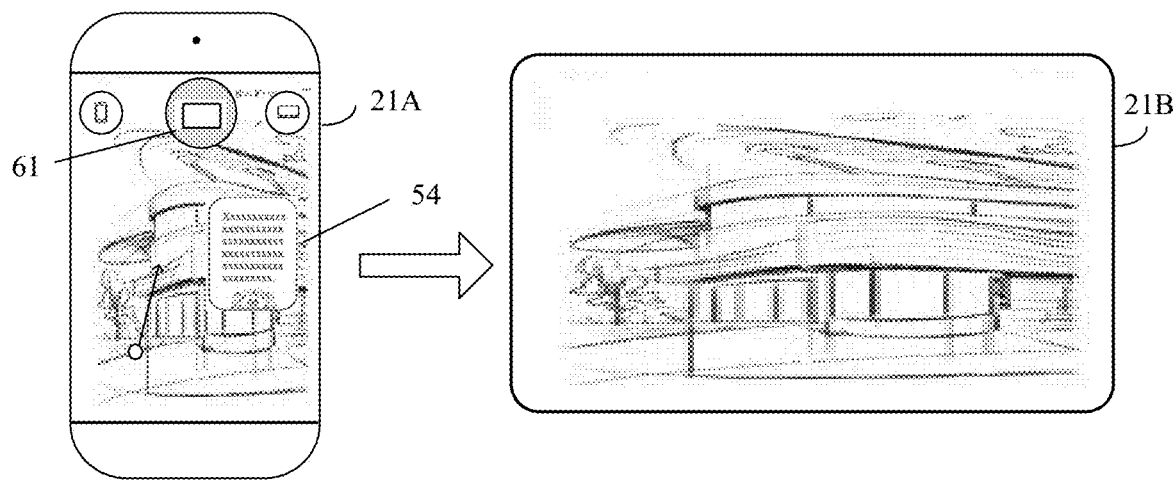
FIG. 9B is a schematic diagram of quickly sending one of two tasks, which are a full-screen task and a floating window task, to a target device in a multi-task scenario according to Embodiment 2 of this application.

For example, as shown in FIG. 9B, if the page is a full-screen task and a floating window task, the user may perform a touch and hold on either of the tasks with one finger, and drag the task to the icon 61. The processor may send the task to the target device 21B, and the target device 21B forms a window based on the received task.

Figure 9C:
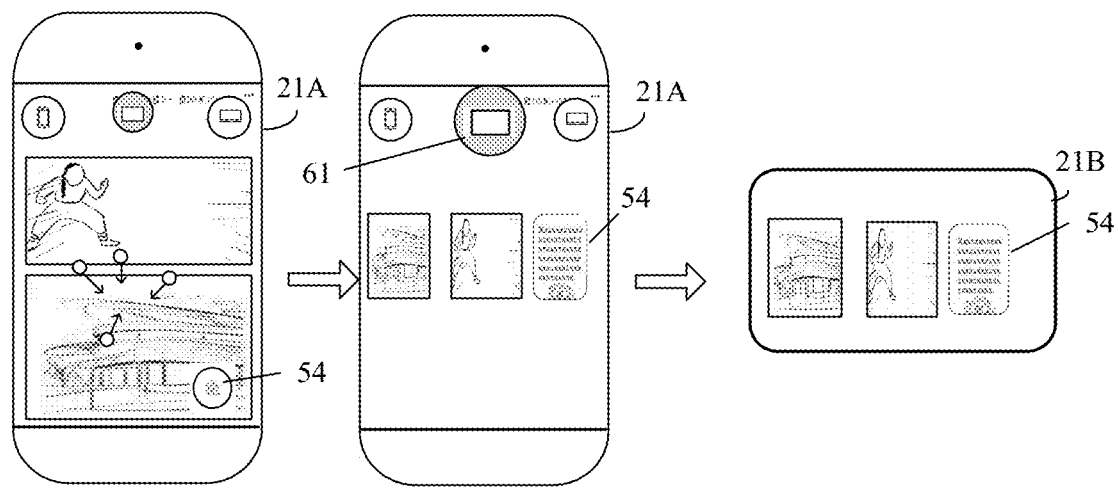
FIG. 9C is a schematic diagram of quickly sending a plurality of tasks, which are split-screen tasks and a floating window task, to a target device in a multi-task scenario according to Embodiment 2 of this application.

For example, as shown in FIG. 9C, if a current page is a plurality of split-screen tasks, or the current page is a split-screen task and a floating window/floating bubble task, after the user performs a multi-finger pinch at any position on the screen, the processor generates scaled-down images of the plurality of tasks on the current page. The user taps the icon 61, and the processor may send the scaled-down images of the plurality of tasks to the target device 21B. Then the target device 21B generates a plurality of floating windows based on the plurality of received tasks.

Figure 9D:
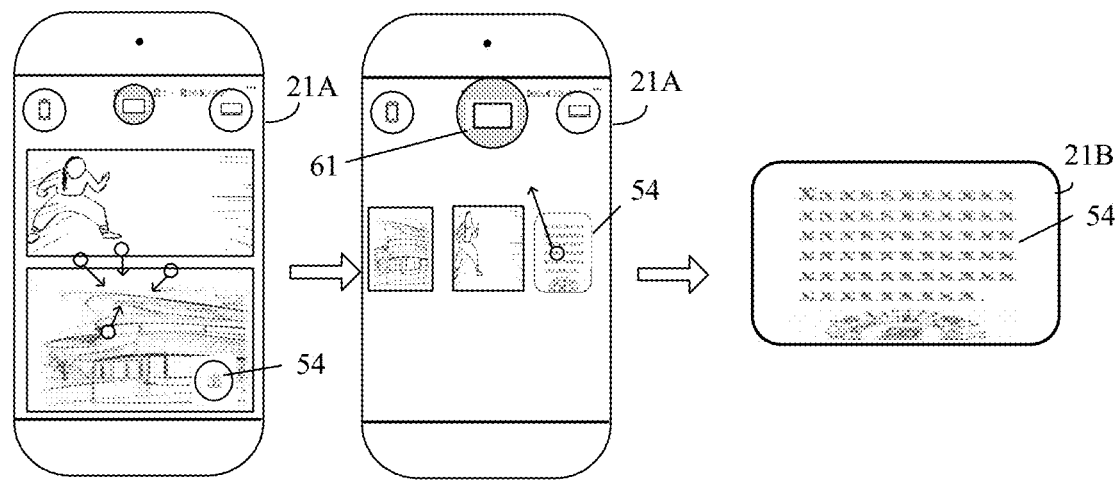
FIG. 9D is a schematic diagram of quickly sending one in a plurality of tasks, which are split-screen tasks and a floating window task, to a target device in a multi-task scenario according to Embodiment 2 of this application.

For example, as shown in FIG. 9D, if the page is split-screen tasks, or a split-screen task and a floating window/ floating bubble 54, after the user performs a multi-finger pinch at any position on the screen, the processor generates scaled-down images of the plurality of tasks on the current page. Alternatively, the user may perform a touch and hold on any task 54 with one finger, and drag the task to the icon 61. The processor may send the task to the target device 21B, and the target device 21B forms a window based on the received task.

In a possible implementation, due to a multi-finger pinch by the user in a specific window area on the entire screen or a touch and hold with one finger in a blank area in the specific window, a task corresponding to the window area may be sent across devices.

Figure 9E:
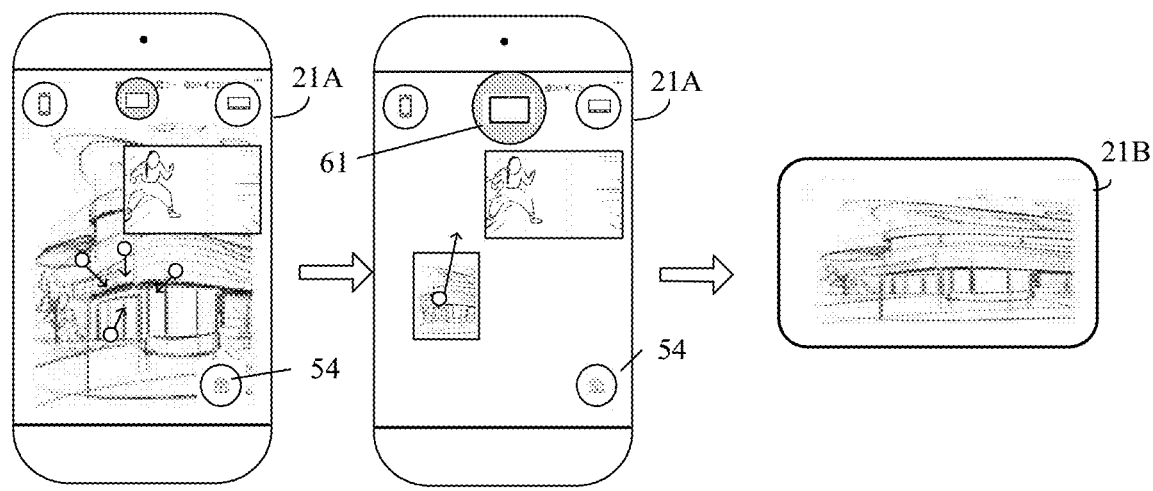
FIG. 9E is a schematic diagram of scaling down a task corresponding to any window on a screen in a multi-task scenario and quickly sending the task to a target device according to Embodiment 2 of this application.

For example, as shown in FIG. 9E, if the page is a full-screen task and a floating window, or the page is split-screen tasks and a floating window, when the user performs a multi-finger pinch in any window on the screen or performs a touch and hold with one finger in a blank area, the processor scales down a task corresponding to the window. The user taps the icon of the target device 21B or drags the task to the position of the icon 61. In this case, the processor may send the task to the target device 21B, and the target device 21B generates a window to display the task.

Embodiment 3 of this application provides a cross-device task migration method. With reference to dragging, based on a specific gesture of the user, a page on which a current task is located to implement quick cross-device migration provided in Embodiment 1 and Embodiment 2, cross-device migration of a single task is extended to a scenario of cross-device migration of a plurality of tasks. Pages or floating windows of a plurality of tasks that are concurrently run with a current task are displayed on a display screen of the terminal 1. The user may select a task, and the processor sends the task to the target device 21B based on motion of a first gesture of the user, or the processor simultaneously sends a plurality of associated tasks to the target device 21B based on the first gesture of the user.

Figure 10:
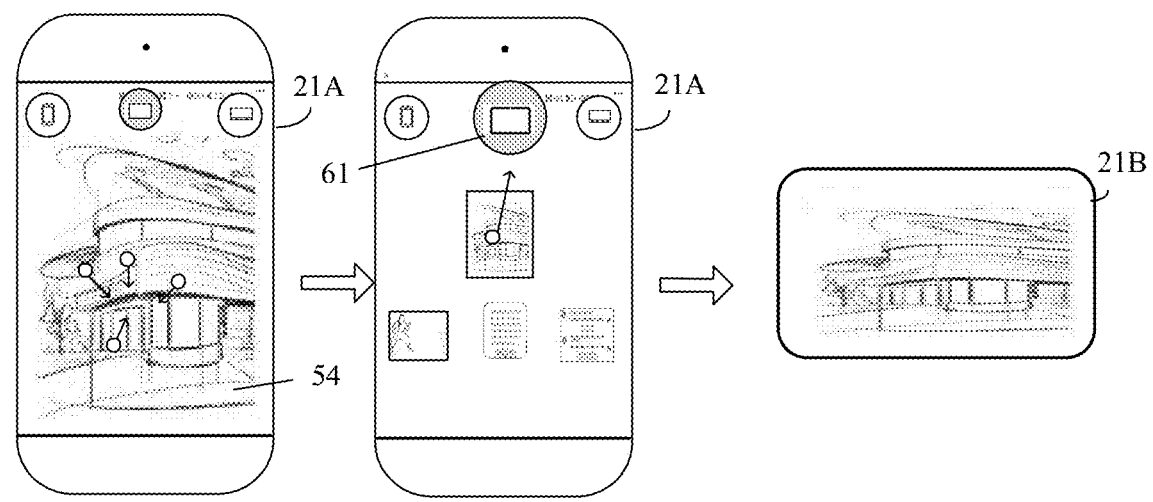
FIG. 10 is a schematic diagram of a scenario of concurrent cross-device multi-task sending according to Embodiment 3 of this application.

In a possible implementation, as shown in FIG. 10, when the user performs a multi-finger pinch or performs a touch and hold with one finger in a blank area on a page of an application displayed on the display screen, the processor may scale down the current page, and display another instance in the application and another task related to the current page. When the user taps the icon 61 of the target device 21B or drags a task to the position of the icon 61 of the target device 21B, the processor may send the task to the target device 21B, and the target device 21B generates a window to display the task.

An embodiment of this disclosure provides a cross-device task migration apparatus, including: at least one memory, configured to store a program; and at least one processor, configured to execute the program stored in the memory. When the program stored in the memory is executed, the processor is configured to perform the cross-device task migration method according to any one of the foregoing embodiments. Beneficial effects thereof are described above. Details are not described again.

An embodiment of this disclosure provides a cross-device task migration system, including at least a first terminal and a second terminal, where the two terminals communicate and connect with each other. The first terminal includes: at least one memory configured to store a program; and at least one processor, configured to execute the program stored in the memory. When the program stored in the memory is executed, the processor is configured to perform the cross-device task migration method according to any one of the foregoing embodiments. The second terminal is configured to receive and display content for migration sent by the first terminal.

An embodiment of this disclosure provides a storage medium, where the storage medium stores instructions. When the instructions are run on a terminal, the first terminal is enabled to perform the cross-device task migration method according to any one of the foregoing embodiments.

An embodiment of this disclosure provides a program product including instructions. When the instructions are run on a processor, the processor is enabled to perform the cross-device task migration method according to any one of the foregoing embodiments.

A person of ordinary skill in the art may be aware that the units and algorithm steps described with reference to the examples in embodiments disclosed in this disclosure may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this disclosure.

In addition, aspects or features in embodiments of this disclosure may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk drive, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this disclosure may represent one or more devices and/or other machine-readable media that are configured to store information. The term "machine-readable media" may include but is not limited to radio channels and various other media that can store, include, and/or carry instructions and/or data.

It should be understood that sequence numbers of the foregoing processes do not mean execution sequences in various embodiments of this disclosure. The execution sequences of the processes should be determined based on functions and internal logic of the processes, and should not constitute any limitation on the implementation processes of embodiments of this disclosure.

It may be clearly understood by a person skilled in the art that, for the purpose of convenient and brief description, for a detailed working process of the foregoing system, apparatus, and unit, reference should be made to the corresponding process in the foregoing method embodiment, and details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not implemented. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. The parts displayed as units may or may not be physical units, in other words, may be located in one position, or may be distributed on a plurality of network units. Some or all of the units may be selected based on actual requirements to achieve the objectives of the solutions of the embodiments.

When the functions are implemented in a form of a software functional unit and sold or used as an independent product, the functions may be stored in a computer-readable storage medium. Based on such an understanding, the technical solutions of the embodiments of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in embodiments of this disclosure. The foregoing storage medium includes any medium that can store program code, like a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A cross-device task migration method performed by a first terminal, wherein the method comprises:
    obtaining a first gesture performed on a current page, and scaling down the current page by generating scaled-down images of a plurality of tasks that are concurrently displayed on the current page, wherein the first gesture indicates to migrate a task;
    determining a second terminal, wherein the second terminal is at least one of at least one online device around the first terminal;
    determining content for migration based on the scaled-down current page, wherein the content for migration comprises the scaled-down images of the plurality of tasks; and
    sending the content for migration to the second terminal based on a second gesture to implement cross-device task migration, wherein the first gesture and second gesture are pre-specified hand motions,
    wherein the obtaining the first gesture performed on the current page, and scaling down the current page comprises: scaling down the current page based on a motion speed of the first gesture performed on the current page; or when the first gesture slides to a preset interaction area, displaying the scaled-down current page in a floating window/floating bubble; and
    wherein after scaling down the current page, the method comprises: when the current page is a child-level page, displaying a transparent or semi-transparent previous-level page on a background layer; or when the current page is a first-level page, displaying a transparent or semi-transparent home screen on the background layer.

2. The cross-device task migration method according to claim 1, wherein the obtaining the first gesture performed on the current page, and scaling down the current page comprises:
    scaling down, based on the first gesture performed on the current page, the current page to a preset threshold, and displaying the current page in a floating window.

3. The cross-device task migration method according to claim 1, wherein after the scaling down the current page, the method comprises: displaying a super favorites icon and a floating window icon; wherein the method comprises: saving, in super favorites based on a gesture performed on the super favorites icon, current content corresponding to the current page, and sharing the current content with the second terminal.

4. The cross-device task migration method according to claim 3, wherein the determining the second terminal comprises:
    obtaining application configuration information of the at least one online device around the first terminal by using a communication technology that is sound wave, carrierless communication, wireless fidelity, or Bluetooth; and
    determining, based on the application configuration information of the at least one online device around the first terminal, a device that is in the at least one online device and that matches an application corresponding to the current page of the first terminal as the second terminal.

5. The cross-device task migration method according to claim 1, wherein the determining content for migration based on the scaled-down current page comprises:
    determining, based on the scaled-down current page, that the content for migration comprises one of the following content or a combination thereof: a partial screenshot, a full-screen screenshot, at least one split-screen page, at least one floating window, or at least one floating bubble of the current page.

6. The cross-device task migration method according to claim 1, wherein the determining content for migration based on the scaled-down current page comprises:
    determining, based on the scaled-down current page, that the content for migration comprises one of the following content or a combination thereof: a link of the current page, a full-screen screenshot and a corresponding application that is being executed, a partial screenshot and a corresponding application that is being executed, at least one split-screen page and a corresponding application that is being executed, at least one floating window and a corresponding application that is being executed, or at least one floating bubble and a corresponding application that is being executed.

7. The cross-device task migration method according to claim 1, wherein the second gesture comprises one of the following gestures: a one-finger or multi-finger tap, touch and hold and drag with one finger or a plurality of fingers, and a one-finger or multi-finger push;
    wherein the sending the content for migration to the second terminal based on a second gesture comprises:
    extracting the content for migration based on a position of a one-finger tap or multi-finger tap performed on the current page, and sending the content for migration to the second terminal, wherein the content for migration comprises one of the following content or a combination thereof: an attachment, a picture, a video, or a link.

8. The cross-device task migration method according to claim 1, wherein the sending the content for migration to the second terminal based on a second gesture comprises: directly starting, by the first terminal, an application corresponding to the content for migration on the second terminal through communication or remote control, and sending the content for migration to the second terminal; or wherein the first terminal generates a mirror of the current task on the second terminal through communication or remote control.

9. A apparatus, comprising: at least one memory, configured to store a program; and at least one processor, configured to execute the program stored in the memory, wherein when the program stored in the memory is executed, the processor is configured to:

obtain a first gesture performed on a current page and scale down the current page by generating scaled-down images of a plurality of tasks that are concurrently displayed on the current page, wherein the first gesture indicates to migrate a task;

determine a second terminal, wherein the second terminal is at least one of at least one online device around the first terminal; determine content for migration based on the scaled-down current page, wherein the content for migration comprises the scaled-down images of the plurality of tasks; and send the content for migration to the second terminal based on a second gesture to implement cross-device task migration, wherein the first gesture and second gesture are pre-specified hand motions, wherein the obtain the first gesture performed on the current page and scale down the current page comprises: scale down the current page based on a motion speed of the first gesture performed on the current page; or when the first gesture slides to a preset interaction area, display the scaled-down current page in a floating window;

wherein after scaling down the current page, the processor is further configured to: when the current page is a child-level page, display a transparent or semi-transparent previous-level page on a background layer; or when the current page is a first-level page, display a transparent or semi-transparent home screen on the background layer.

10. The apparatus according to claim 9, wherein the obtain the first gesture performed on the current page and scale down the current page comprises:

scale down the current page to a preset threshold based on the first gesture performed on the current page, and display the current page in a floating window.

11. The apparatus according to claim 9, wherein when the program stored in the memory is executed, the processor is further configured to: after the scale down the current page, display a super favorites icon and a floating window icon; save in super favorites based on a gesture performed on the super favorites icon, current content corresponding to the current page, and share the current content with the second terminal.

12. The apparatus according to claim 9, wherein the determine the second terminal comprises:

obtain application configuration information of the at least one online device around the first terminal by using a communication technology that is sound wave, carrierless communication, wireless fidelity, or Bluetooth; and determine based on the application configuration information of the at least one online device around the first terminal, a device that is in the at least one online device and that matches an application corresponding to the current page of the first terminal as the second terminal.

13. The apparatus according to claim 9, wherein the determine content for migration based on the scaled-down current page comprises:

determine based on the scaled-down current page, that the content for migration comprises one of the following content or a combination thereof: a partial screenshot, a full-screen screenshot, at least one split-screen page, at least one floating window, or at least one floating bubble of the current page.

14. The apparatus according to claim 9, wherein the determine content for migration based on the scaled-down current page comprises:

determine based on the scaled-down current page, that the content for migration comprises one of the following content or a combination thereof: a link of the current page, a full-screen screenshot and a corresponding application that is being executed, a partial screenshot and a corresponding application that is being executed, at least one split-screen page and a corresponding application that is being executed, at least one floating window and a corresponding application that is being executed, or at least one floating bubble and a corresponding application that is being executed.

15. The apparatus according to claim 9, wherein the second gesture comprises one of the following gestures: a one-finger or multi-finger tap, touch and hold and drag with one finger or a plurality of fingers, and a one-finger or multi-finger push;

wherein the send the content for migration to the second terminal based on a second gesture comprises: extract the content for migration based on a position of a one-finger tap or multi-finger tap performed on the current page, and send the content for migration to the second terminal, wherein the content for migration comprises one of the following content or a combination thereof: an attachment, a picture, a video, or a link.

16. The apparatus according to claim 9, wherein the send the content for migration to the second terminal based on a second gesture comprises: directly start an application corresponding to the content for migration on the second terminal through communication or remote control, and send the content for migration to the second terminal; or wherein the first terminal generates a mirror of the current task on the second terminal through communication or remote control.

* * * * *